(12) United States Patent
Date et al.

(10) Patent No.: US 6,493,504 B1
(45) Date of Patent: Dec. 10, 2002

(54) STORAGE MEDIUM, RECORDING APPARATUS, PLAYBACK APPARATUS, RECORDING METHOD, AND COMPUTER-READABLE STORAGE MEDIUM

(75) Inventors: Akira Date, Kunitachi (JP); Masahiro Kageyama, Hachioji (JP); Tamotsu Ito, Ayase (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/369,401

(22) Filed: Aug. 6, 1999

(30) Foreign Application Priority Data

Aug. 7, 1998 (JP) .............................. 10-224009
Aug. 20, 1998 (JP) .............................. 10-233837

(51) Int. Cl.⁷ .............................................. H04N 5/781
(52) U.S. Cl. ............................ 386/95; 386/96; 386/97; 386/125
(58) Field of Search ............................... 386/38, 39, 40, 386/33, 45, 54, 96, 97, 98, 99, 100–107, 111–112, 121, 129, 126, 125, 95; 348/231.2, 231.3, 231.4, 231.5, 231.6; H04N 5/76, 5/781, 9/79, 5/92, 5/225

(56) References Cited

U.S. PATENT DOCUMENTS

| | | | | |
|---|---|---|---|---|
| 5,781,689 A | * | 7/1998 | Horii | 386/96 |
| 5,884,004 A | * | 3/1999 | Sato et al. | 386/126 |
| 5,999,696 A | * | 12/1999 | Tsuga et al. | 386/98 |
| 6,167,192 A | * | 12/2000 | Heo | 386/124 |
| 6,253,018 B1 | * | 6/2001 | Moriyama et al. | 386/126 |
| 6,301,431 B1 | * | 10/2001 | Yamagata et al. | 386/96 |

FOREIGN PATENT DOCUMENTS

| | | |
|---|---|---|
| EP | 0 599 466 A1 | 6/1994 |
| EP | 0 678 816 A2 | 10/1995 |
| EP | 0 802 688 A2 | 10/1997 |
| JP | 5-252495 | 9/1993 |
| JP | 6-139287 | 5/1994 |
| JP | 11-144378 | 5/1999 |

* cited by examiner

Primary Examiner—Thai Tran
(74) Attorney, Agent, or Firm—Antonelli, Terry, Stout & Kraus, LLP

(57) ABSTRACT

A computer readable storage medium being capable of recording a large amount of still picture data thereon, allowing users to make a search based on recording times, and reducing the data size of recording time information, a recording apparatus, and a playback apparatus. When recording still pictures on a large-capacity storage medium, management information on recording times becomes so large that it becomes hard for the recording apparatus and the playback apparatus to process. To minimize the amount of data for managing still picture recording times, N (N is an integer equal to or larger than 1.) still pictures are grouped and, for each group, a first still picture recording time (F_RECTM) and a last still picture recording time are recorded as management information.

8 Claims, 14 Drawing Sheets

FIG. 13
(a) MANAGEMENT INFORMATION (VOBGI)
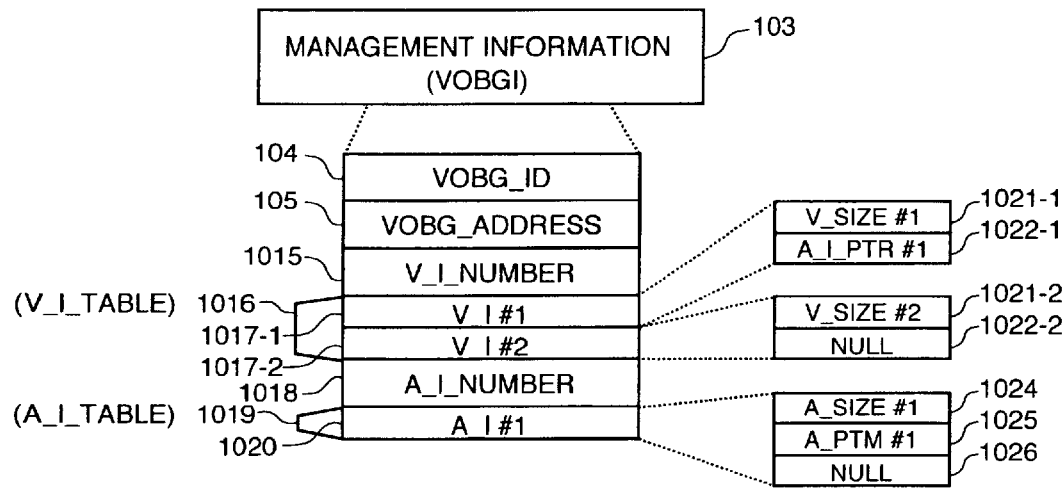
(b) EXAMPLE OF VOB FILE
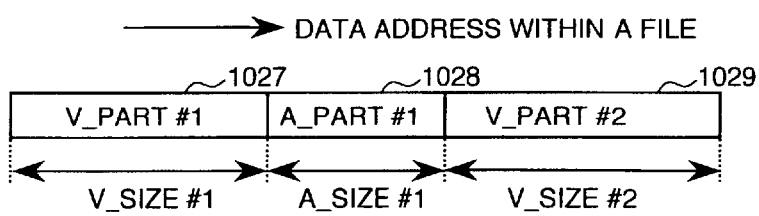
(c) ANOTHER EXAMPLE OF VOB FILE
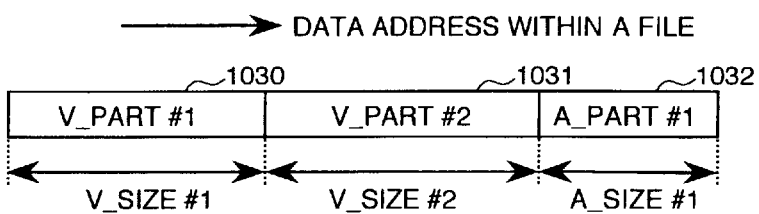

FIG. 14
(a) EXAMPLE OF V_I DATA STRUCTURE
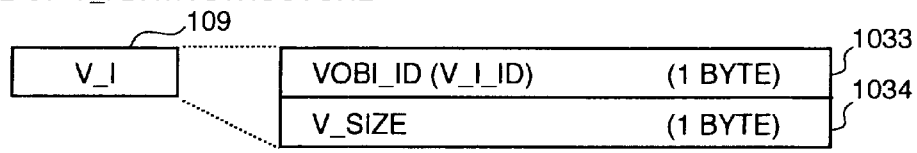
(b) EXAMPLE OF V_OA_I DATA STRUCTURE
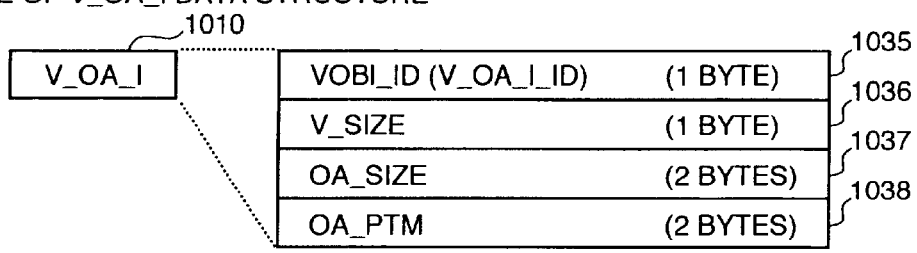
(c) EXAMPLE OF V_AA_I DATA STRUCTURE
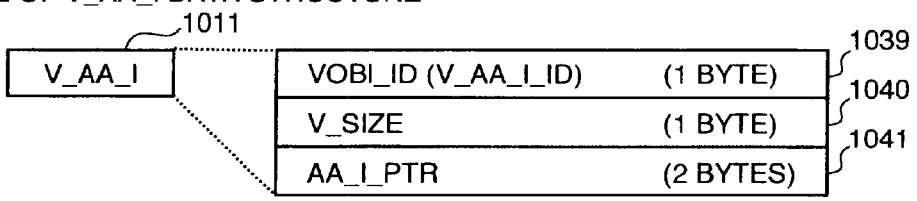
(d) EXAMPLE OF V_OA_AA_I DATA STRUCTURE
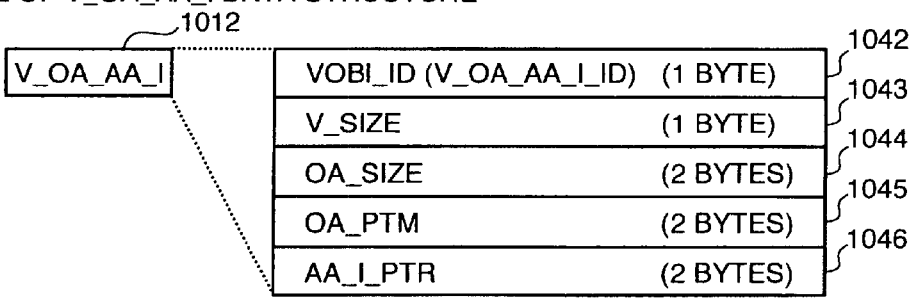
(e) EXAMPLE OF VOBI_ID DATA STRUCTURE
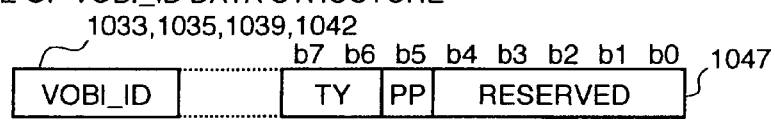
TY (TYPE)... "00": V_I_ID
                "01": V_OA_I_ID
                "10": V_AA_I_ID
                "11": V_OA_AA_I_ID
PP (PLAYBACK PERMISSION) ... "0": PLAYBACK IS PERMITTED.
                                      "1": PLAYBACK IS PROHIBITTED.

FIG. 15
(a) EXAMPLE OF FILE STRUCTURE
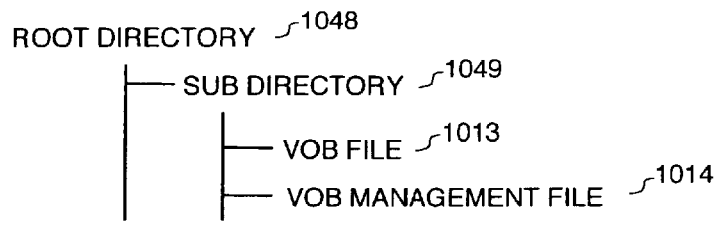
(b) EXAMPLE OF VOB FILE
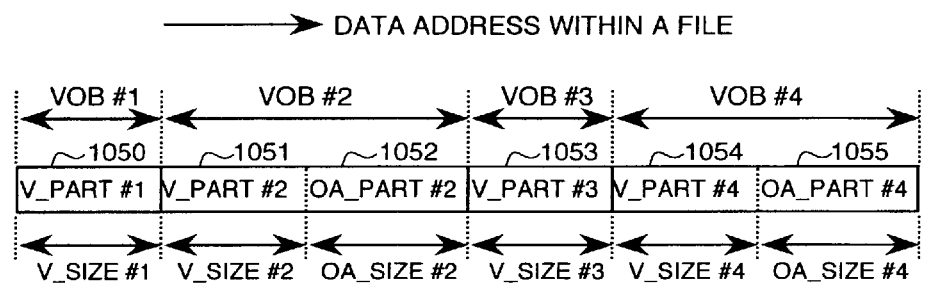
FIG. 16
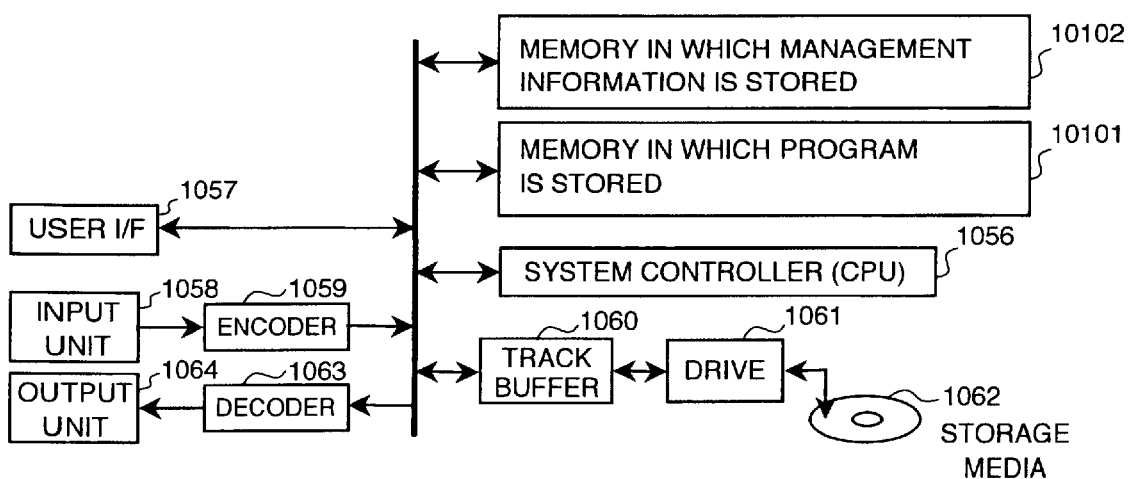

STORAGE MEDIUM, RECORDING APPARATUS, PLAYBACK APPARATUS, RECORDING METHOD, AND COMPUTER-READABLE STORAGE MEDIUM

BACKGROUND OF THE INVENTION

The present invention relates to a rewritable storage medium, a recording apparatus and a playback apparatus for use with the storage medium, a method for recording data on the storage medium, and to a computer program executing the recording method. More particularly, the present invention is adaptive to, and preferably used with, an optical disc on which a large amount of still picture data is recorded.

Large-capacity, rewritable optical disc recording media, such as DVD-RAMs or DVD-RWs, have been made available, and many technologies for recording picture data or audio data on the media are now being developed. Video data coded, for example, in the MPEG (Moving Picture Experts Group) system described in the ISO/IEC11172 or ISO/IEC13818 standard is usually used. Still picture data coded in the intraframe compression method (I picture) of the MPEG (Moving Picture Experts Group) system or in the JPEG system described in the ISO/IEC10918-1 standard is usually used.

Digital VCRs(digital video cassette recorders) using magnetic tapes as recording media or electric still cameras using memories such as a flash memory as recording media are already in practical use for storing coded video or still pictures with audio.

Recording apparatuses using optical discs as recording media, such as DVD-RAMs, have many advantages over conventional digital VCRs or electric still cameras in that they feature random accessibility which cannot be attained by magnetic tapes, large-capacity which cannot be achieved by memories such as a flash memory, and a low cost per bit. Therefore, recording apparatuses using optical disc media allow the user to play back data independently of the sequence in which data was recorded and to process as many as tens of thousands of still pictures. For this reason, optical disc recording media are expected to be widely used as new AV (audio-visual) recording media.

SUMMARY OF THE INVENTION

A DVD-RAM disc allows moving pictures and still pictures to be mixed. Especially, for still pictures, a huge number of still pictures which cannot be recorded by a conventional electric still camera can be recorded. For example, a 4.7 GB DVD-RAM disc can record thereon about 64,000 still pictures each of which is an MPEG-coded still picture (I picture) of about 80 KB.

Unlike a storage medium such as a digital VCR tape from which data is played back in the order in which it was recorded, an optical disc medium such as a DVD-RAM disc allows the user to access data randomly. For data to be accessed randomly, management information, such as the addresses and sizes of still picture data as well as the playback times of audio data recorded with still pictures are recorded.

Playing back still pictures with a playback apparatus requires two steps. First, a still picture data address and so on are read from the management data recorded on the optical disk medium, and then still picture data recorded at the address that was read is played back. Therefore, when playing back a plurality of still pictures, each still picture requires the above two steps.

Also, recording still pictures and so forth onto an optical disc with a recording apparatus requires two steps. First, still picture data is recorded, and then management information such as the still picture data address is recorded. Therefore, when recording a plurality of still pictures, each still picture requires the above two steps.

The optical disc recording or playback apparatus has an optical head for recording and playing back information. This optical head is slow in accessing data because it is larger and heavier than a magnetic head. Therefore, playing back or recording a plurality of still pictures, which requires two steps, takes long and the apparatus cannot perform random access quickly.

To solve this problem, the optical disc recording apparatus and the playback apparatus store management information, read from the optical disc, into memory. Once the management information is stored into memory of the playback apparatus, the apparatus need not read management information from the disc each time it plays back a still picture, thus reducing the time needed to playback a plurality of still pictures. Also, the recording apparatus stores management information about a plurality of still pictures into the memory of the apparatus and records the management information onto the disc at a time. This eliminates the need to record management information each time a still picture is recorded, thus reducing the time needed to record a plurality of still pictures.

However, because a large-capacity storage medium such as a DVD-RAM records tens of thousands of still pictures thereon, the amount of management information on recorded still pictures becomes very large and a large amount of memory capacity is needed in the apparatus. Although the memory price has gone down recently, it is difficult to install megabytes of memory onto an AV apparatus. In addition, considering the memory backup provided for use at emergency, it is unrealistic for an AV apparatus to process megabytes of management information.

To solve this problem, a technology is disclosed in the specification of the European Patent Application No. 99304691.1 filed on Jun. 16, 1999 or the corresponding U.S. patent application Ser. No. 09/332,882 filed on Jun. 15, 1999 by some of the inventors of the present invention. To prevent an increase in the management information size, the technology disclosed in the above patent application records management information, such as data addresses and sizes or audio data playback times, in variable-size management information tables proportional in size to the number of still pictures or the number of audio data pieces.

However, the technology described above does not take the following into account. First, the technology does not support the function to manage still picture data recording times. Because the technology described above does not support a search for data with the use of recording times, there is a problem with processing a request to search a huge number of still pictures for a desired still picture.

For example, as shown in FIG. 3, when a recording time (RECTM) is represented by a 7-byte data structure composed of the year (2 bytes), month (1 byte), day (1 byte), hour (1 byte), minute (1 byte), and second (1 byte), adding the recording time (RECTM) to each of about 64,000 still pictures requires that the data size of the management information used by the above-described technology be increased by as many as about 438K bytes (=64,000×7).

As mentioned above, the system controller within the apparatus should have the management information always in its own memory for quick random access. To reduce the memory size (cost reduction) of AV apparatuses, that is, to reduce the cost, the data size of the management information must be minimized.

It is a first object of the present invention to provide a recording apparatus and a playback apparatus, primarily used for optical discs, which allow the user to search for data based on recording times and which have a data structure preventing the data size of management information from increasing, and computer programs which control these apparatuses.

Second, the technology does not support the function to solve problems associated with still picture deletion.

FIG. 12 shows the still picture management method according to the technology described above. First, still picture group management information (VOBGI) 103 is provided to manage a plurality of still picture data pieces (VOB) 101 as a still picture group (VOBG) 102. The still picture group management information (VOBGI) 103 comprises still picture group identification information (VOBG_ID) 104, start and end address information (VOBG_Address) 105 on the still picture group (VOBG) 102, number-of-pictures information (V_I_Number) 1015 representing the number of still pictures managed in this group, picture management information table (V_I_Table) 1016 containing only picture management information (V_I) 1017 on the pictures of the still picture data (VOB) 101, number-of-audio-data information (A_I_Number) 1018 representing the number of audio data pieces managed in this group, and audio management information table (A_I_Table) 1019 containing only audio management information (A_I) 1020 on the audio data. The picture management information (V_I) 1017 comprises an picture data size (V_Size) 1021 and audio pointer information (A_I_PTR) 1022 providing a link to the audio management information (A_I) 1020 corresponding to the audio data to be played back in synchronization with the picture. The audio management information (A_I) 1020 comprises audio data address information (A_Address) 1023, audio data size (A_Size) 1024, audio playback time (A_PTM) 1025, and audio pointer information (A_I_PTR) 1026 providing a link to other management information (A_I) 1020. When there is no audio data to be linked, NULL is recorded in the audio pointer information (A_I_PTR) 1022, 1026 to indicate an invalid value.

The technology described above has two separate tables: picture management information table (V_I_Table) 1016 and audio management information table (A_I_Table) 1019. In addition, the audio management information (A_I) 1020 contains audio data address information (A_Address) 1023.

Still picture data and audio data are recorded in files on the storage medium. Because the addresses in the file are contiguous, deleting a still picture and the audio data synchronizing with it causes the file to be restructured to close up the deleted part and to make the addresses contiguous within the file. Therefore, when the recording position of audio data is managed by the audio data address information (A_Address) 1023 within the file, all the audio data address information (A_Address) 1023 after the deleted part must be replaced with new address information generated after restructuring. This will require a very long time for replacing address information when tens of thousands of still picture data are recorded.

Another way to get address information is to simply delete the address information 1023 from the management information shown in FIG. 12 and then to add up the picture and audio data sizes 1021, 1024 beginning with the start, as shown in FIG. 13, (a).

Although this method eliminates the need for address replacement after restructuring described above, following problem arises.

For example, assume that two different data structures described below occur in the file. One data structure, shown in FIG. 13, (b), is composed of the video part (V_Part #1) 1027 of still picture #1, followed by the post-recorded audio part (A_Part #1) 1028 of still picture #1, followed by the video part (V_Part #2) 1029 of still picture #2. Another data structure, shown in FIG. 13, (c), is composed of the video part (V_Part #1) 1030 of still picture #1, followed by the video part (V_Part #2) 1031 of still picture #2, followed by the post-recorded audio part (A_Part #1) 1032 of still picture #1. Although the data structures differ, management information table entries are created as shown in FIG. 13, (a). That is, V_I #1(1017-1) in the picture management information table (V_I_Table) 1016 comprises the picture data size (V_Size #1) 1021-1 of V_Part #1(1027) or V_Part #1(1030) and the audio pointer information (A_I_PTR) 1022-1 providing a pointer to A_Part #1(1028) or A_Part #1(1032). V_I #2(1017-2) comprises the picture data size (V_Size #2) 1021-2 of V_Part #2(1029) or V_Part #2(1031) and audio pointer information (NULL) 1022-2 indicating that there is no audio data to be linked. A_I #1(1020) comprises the audio data size (A_Size #1) 1024 of A_Part #1(1028) or A_Part #1(1032), audio playback time (A_PTM #1) 1025, and audio pointer information (NULL) 1026 indicating that there is no audio data to be linked. Therefore, these two cannot be distinguished.

In addition, the configurations of the picture management information (V_I)(1017) and the audio management information (A_I)(1020) shown in FIG. 12 are redundant. The data sizes may further be reduced.

It is a second object of the present invention to provide a recording apparatus and a playback apparatus for use with an optical disc with a data management structure capable of managing still picture data and audio data to be played back in synchronization the still picture data without any problem, significantly reducing the time needed to re-configure the management information when still pictures are deleted, and reducing the management information sizes.

BRIEF DESCRIPTION OF THE DRAWINGS

FIG. 13 is a diagram illustrating the technology proposed by the inventor and his group.

FIG. 14 is a diagram showing the detailed configuration of the embodiment of the present invention.

FIG. 15 is a diagram showing an example of a file used in the embodiment of the present invention.

FIG. 16 is a diagram showing the configuration of the embodiment of a recording/playback apparatus according to the present invention.

DESCRIPTION OF THE PREFERRED EMBODIMENTS

An embodiment of the present invention which achieves the first object will be detailed.

Figure 1:
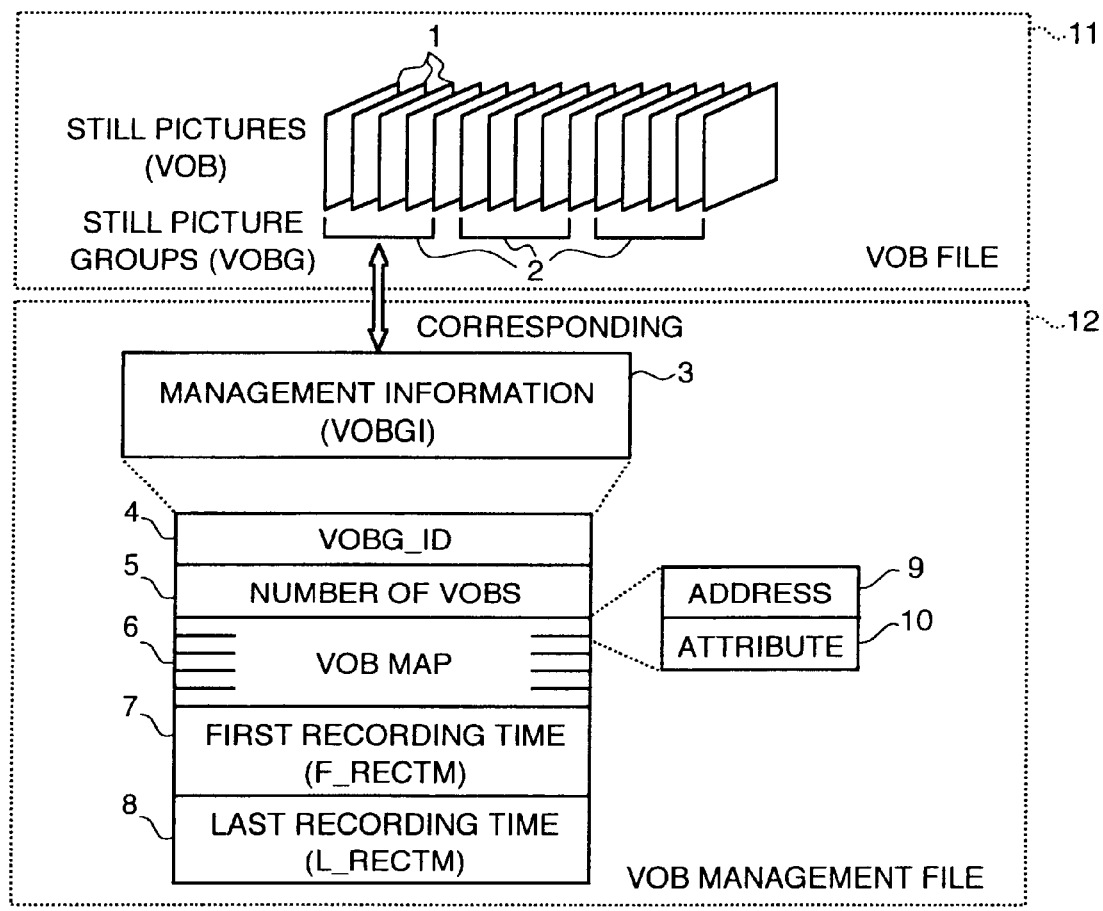
FIG. 1 is a diagram showing the configuration of a first embodiment of the present invention.

FIG. 1 shows the configuration of a first embodiment of the present invention. In the figure, N (an integer equal to or larger than 1) still pictures (VOB) 1 coded, for example, in the I picture compression method of MPEG are grouped into one still picture group (VOBG) 2. Group generation is controlled so that the next still picture group (VOBG) 2 is generated when the number of still pictures (VOB) 1 of the still picture group (VOBG) 2 reaches a predetermined value (for example, 64) during still picture recording or when the operation mode is switched from video recording mode to still picture recording mode. Data (coded stream data) of the still pictures (VOB) 1 is recorded on a storage medium as a VOB file 11 which will be described later, while information used to define the still picture groups (VOBG) 2 is recorded on the storage medium as a VOB management file 12.

The VOB management file (VOBGI) 12 comprises management information (VOBGI) 3 corresponding to each still picture group (VOBG) 2. That is, each still picture group (VOBG) 2 has its own management information (VOBGI) 3 in this file. Note that information used to manage M (an integer equal to or larger than 1) pieces of management information (VOBGI) 3 may be provided separately in the VOB management file (VOBGI) 12. This information is not shown in the figure. The management information (VOBGI) 3 comprises a still picture group identifier (VOBG_ID) 4, number-of-VOBs information 5, a VOB map 6, a first recording time (F_RECTM) 7, and a last recording time (L_RECTM) 8. Each entry will be described below.

The still picture group identifier (VOBG_ID) 4, a unique value in the VOB management file 12, identifies each piece of management information (VOBGI) 3 and the corresponding still picture group (VOBG) 2. Serial numbers beginning with the start of the VOB management file 12 may be used for this information, in which case the still picture group identifier (VOBG_ID) 4 may be omitted.

The number-of-VOBs information 5 indicates the number of still pictures (VOB) 1 of the still picture group (VOBG) 2. This number-of-VOBs information determines the data length of the VOB map 6 which will be described below.

The VOB map 6 contains information on the address 9 and the attribute (10) of each still picture (VOB) 1. Note that it is also possible to store data sizes, instead of addresses 9, and to find the address of a desired location by add up (summation) the data sizes beginning at the start and ending at the address immediately preceding the location. The attribute (10) includes the number of horizontal and vertical pixels of the still picture, still picture display time, whether or not there is audio to be played back in synchronization with the still picture, audio play back time, and audio data address.

Although the recording time (RECTM) of each still picture (VOB) 1 may be stored as management information as described above, this method makes the data size of management information too large. The first recording time (F_RECTM) 7 and the last recording time (L_RECTM) 8 are one of characteristics of the present invention. Therefore, to reduce the data size, the recording times (RECTM) are stored for each still picture group (VOBG) 2 which groups N (an integer equal to or larger than 1) still pictures (VOB) 1. In addition, storing both the first recording time (F_RECTM) 7 and the last recording time (L_RECTM) 8 of the still picture recording times (RECTM) of the still picture group (VOBG) 2 makes it possible to make a search with a time as the key. That is, when the user enters the recording time (TM) of a still picture to be played back or searched for, only the still picture group (VOBG) 2 corresponding to the recording time (TM) is selected for playback or search. That is, only the still picture group (VOBG) 2 whose TM is equal to or later than F_RECTM and equal to or earlier than L_RECTM (F_RECTM(7) $\leq$ TM $\leq$ L_RECTM(8)) is selected. According to the present invention, the data management structure shown in FIG. 1, when recorded on the optical disc, eliminates for the user to search the maximum of about 64,000 still pictures for one desired still picture. Instead, it allows the user to search the maximum number of still pictures (for example, 64) of a still picture group (VOBG) for the desired still picture. Therefore, usability is significantly increased.

Figure 2:
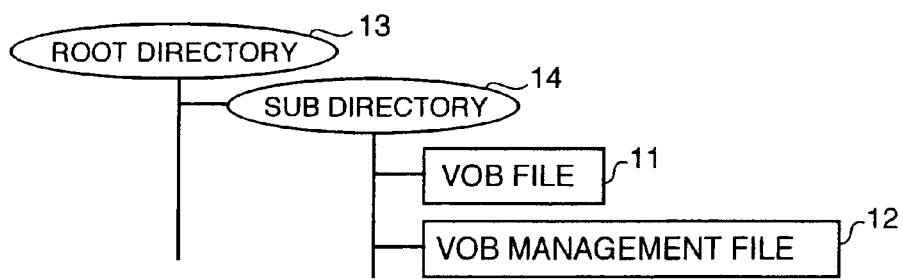
FIG. 2 is a diagram showing the structure a directory used in the first embodiment of the present invention.

FIG. 2 shows an example of directory structure used in the first embodiment of the present invention. On recording media such as a DVD-RAM, coded stream data such as still pictures, management information, and so on are recorded as files containing logically-related data. A storage medium, with a directory structure beginning at a root directory 13, usually has the above-described VOB file 11 and VOB management file 12 generated and stored in a sub-directory 14. Note that, instead of using the sub-directory 14, the VOB file 11 and the VOB management file 12 may be recorded directly below the root directory 13. The file 11 and the VOB management file 12 may also be stored in another sub-directory which is below the sub-directory 14.

Figure 3:
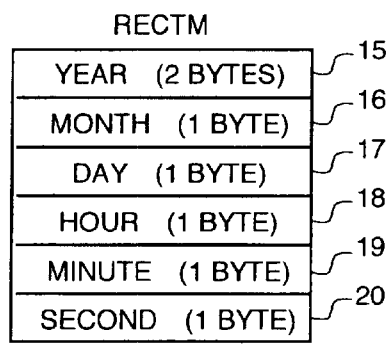
FIG. 3 is a diagram showing the structure of time information used in the first embodiment of the present invention.

FIG. 3 shows the structure of time information used in the first embodiment of the present invention. The figure shows an example of the data structure of a recording time (RECTM) represented by a 2-byte for year 15, 1-byte for month 16, 1-byte for day 17, 1-byte for hour 18, 1-byte for minute 19, and 1-byte for second 20. This data structure may be used also for the first recording time (F_RECTM) 7 and last recording time (L_RECTM) 8 described above. This data structure, if used for the still picture group (VOBG), requires only 14 additional bytes for F_RECTM and L_RECTM. Thus, even if the maximum of about 64,000 still pictures are recorded, with each 64 pictures grouped as a still picture group, this data structure requires about only 14 K bytes (=(64,000×14)/(64×1,024)) of additional space for the management information. As compared to the above-described technology in which a recording time is appended to each still picture and therefore the management information is increased by as many as about 438 K bytes, the embodiment of the present invention increases the management information only by about 3%.

This reduces the amount of management information and the amount of memory that must be installed in the recording/playback apparatus, thus increasing the access speed while reducing the cost.

It should be noted that the present invention is not limited to the data structure shown in the figure but that the recording time may be represented by a data structure represented by the numbers of bytes other than those shown above. In addition, the recording time may be represented by the total number of seconds beginning at a predetermined time (for example, 00:00:00 on Jan. 1, 1990).

Figure 4:
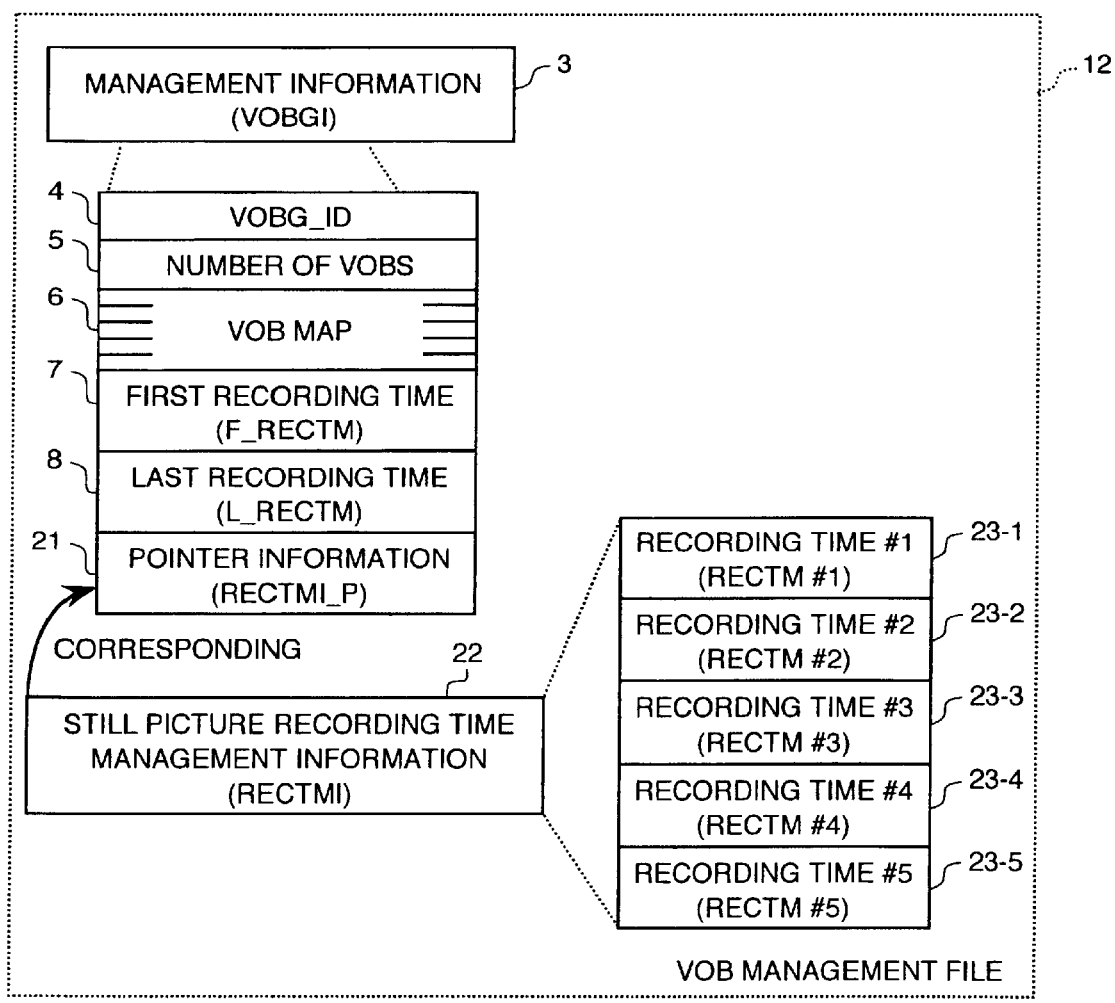
FIG. 4 is a diagram showing the configuration of a second embodiment of the present invention.

FIG. 4 shows the configuration of a second embodiment of the present invention which achieves the first object of the present invention. The figure shows the management information structure which contains the recording time (RECTM) of each still picture data (VOB) on the optical disc medium but which reduces the amount of memory the system controller of the apparatus must hold. Like the structure shown in FIG. 1, the management information (VOBGI) 3 comprises still picture group identifier (VOBG_ID) 4, number-of-VOBs information 5, VOB map 6, first recording time (F_RECTM) 7, and last recording time (L_RECTM) 8. The management information (VOBGI) 3 further comprises pointer information (RECTMI_P) 21 pointing to still picture recording time management information (RECTMI) 22. This pointer information (RECTMI_P) 21 points to the address within the VOB management file 12 where the still picture recording time management information (RECTMI) 22 is stored and may further contain the data size of the still picture recording time management information (RECTMI) 22. Also, with the still picture recording time management information (RECTMI) 22 as a file separate from the VOB management file 12, the file name may be stored as the pointer information (RECTMI_P) 21.

The still picture recording time management information (RECTMI) 22 contains the recording times (RECTM) 23 of the still pictures (VOB) 1 of each still picture group (VOBG) 2. In the example shown in the figure, five still pictures (VOB) are grouped as a still picture group (VOBG). The recording time (RECTM) may be represented by the data structure shown in FIG. 3.

In this configuration, the system controller holds only the management information (VOBGI) 3 in its own memory. When the recording time of each still picture data (VOB) is required, only the still picture recording time management information (RECTMI) of the still picture group (VOBG) to which that still picture (VOB) belongs is read into memory. Therefore, this configuration may reduce the size of required memory. For example, if the pointer information (RECTMI_P) is 4 bytes, the maximum number of still pictures of a still picture group (VOBG) is 64, the maximum number of still picture groups is 1,000 (=64,000/64), and the recording time (RECTM) is 7 bytes, then the increase in required memory is 4,448 bytes (=4×1,000+64×7). Thus, the total of this increase and the increase required for F_RECTM 7 and L_RECTM 8 is about 4% of the increase (about 438 K bytes) according to the technology described above.

Figure 5:
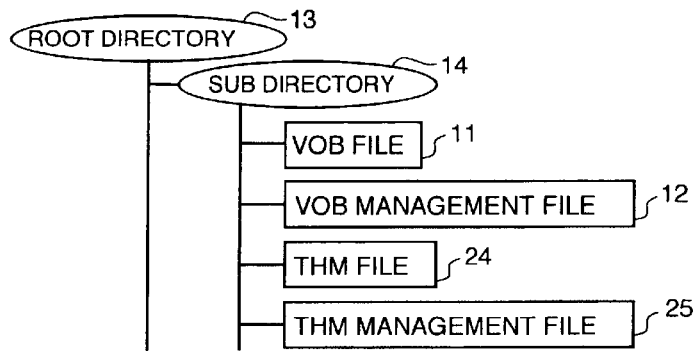
FIG. 5 is a diagram showing the structure a directory used in a third embodiment of the present invention.

FIG. 5 shows the configuration of a directory used in a third embodiment of the present invention to achieve the first object. The recording times (RECTM) of still pictures (VOB) 1 are used primarily for search. Recording times are usually displayed with thumbnail pictures, which are reduced still pictures, for use in search. Thus, a THM file 24 storing therein thumbnail pictures to be searched for and a THM management file 25 storing therein thumbnail picture management information, which will be described later, are added to the directory structure shown in FIG. 2. This allows the recording times (RECTM) of still pictures (VOB) 1 to be managed in the THM management file 25. Although the THM file 24 and the THM management file 25 are in the directory in which the VOB file 11 and the VOB management file 12 are stored, they need not be in that directory but may be in some other sub-directory.

Figure 6:
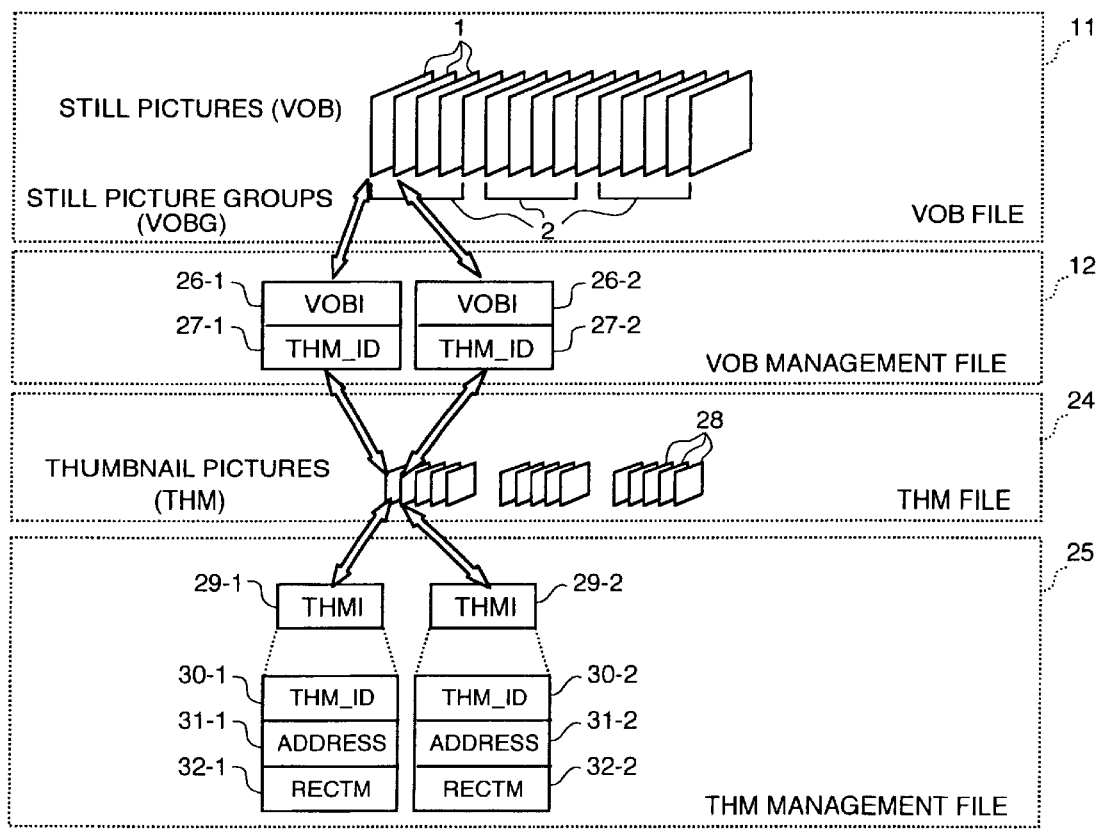
FIG. 6 is a diagram showing the configuration of the third embodiment of the present invention.

FIG. 6 shows the configuration of a third embodiment of the present invention. The figure shows how the recording times (RECTM) 32 of the still pictures (VOB) 1 are stored in the THM management file 25. Like still picture management information (VOBI) 26 for managing still pictures (VOB) 1, thumbnail management information (THMI) 29 for managing thumbnail pictures 28 need not reside in memory. It need only be read into memory at search time. Therefore, with the recording times (RECTM) 32 recorded in the thumbnail management information (THMI) 29, there is no need to increase the amount of memory the system controller must hold. At the same time, because there is a one-to-one correspondence among still pictures (VOB) 1, thumbnail pictures 28, and thumbnail management information (THMI) 29 as shown in the figure, the recording times (RECTM) 32 of the still pictures (VOB) 1 may be stored. In the figure, thumbnail identifiers 27, 30, each unique value in the VOB management file 12 and in the THM management file 25 respectively, are identification information for associating the VOB management information (VOBI) 26 with the thumbnail management information (THMI) 29.

Serial numbers beginning with the start of the VOB management file 12 may also be used for thumbnail identifiers 27, in which case thumbnail identifiers 30 may be omitted. In addition, address information 31 on a position within the THM file, stored in the thumbnail management information (THMI) 29, allows the thumbnail management information (THMI) 29 to be made to correspond to thumbnail pictures 28. In the method shown in the figure, each still picture (VOB) 1 must have its own still picture management information (VOBI) 26 and therefore the size of the VOB management file 12 residing in memory increases. This method may be improved as described below.

Figure 7:
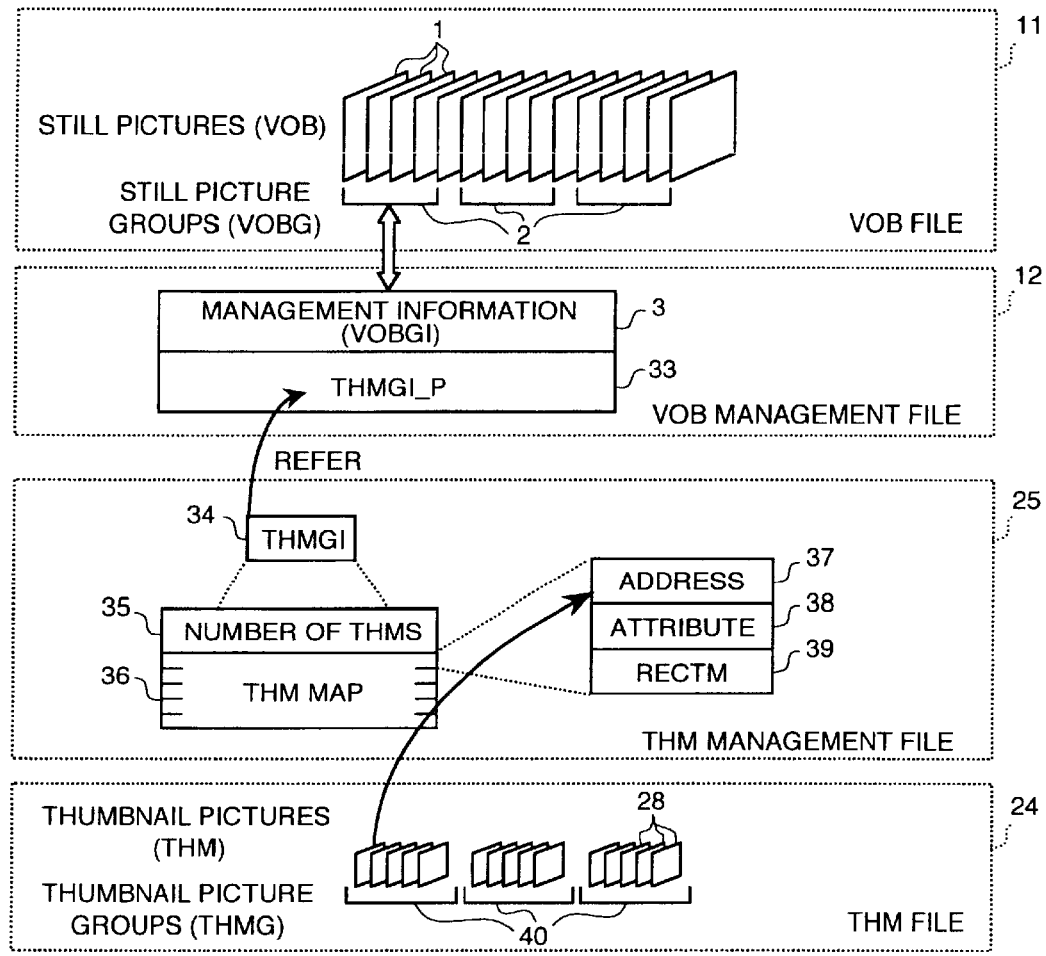
FIG. 7 is a diagram showing the configuration of a fourth embodiment of the present invention.

FIG. 7 shows the configuration of a fourth embodiment of the present invention to achieve the first object. Like the method shown in FIG. 1, N (N is an integer equal to or larger than 1.) still pictures (VOB) 1 are grouped into a still picture group (VOBG) 2, and the still picture group management information (VOBGI) 3 corresponding to each still picture group (VOBG) 2 manages the group. In addition to the entries in the data structure shown in FIG. 1, the still picture group management information (VOBGI) 3 has pointer information (THMGI_P) 33 pointing to thumbnail group management information (THMGI) 34 which will be described later. This pointer information (THMGI_P) 33 points to the address within the THM management file 25 at which thumbnail group management information (THMGI) 34 is stored. This information may also contain information on the data size of the thumbnail group management information (THMGI) 34 and the address name of the THM management file 25.

The thumbnail group management information (THMGI) 34 is information for managing thumbnail groups (THMG) 40 each composed of L (L is an integer equal to or larger than 1.) thumbnail pictures 28. With the value of L made equal to the value of N indicating the number of still pictures (VOB) 1 of a still picture group (VOBG) 2, both groups synchronize with each other and therefore management becomes easy. All thumbnail group management information (THMGI) 34 is collected and recorded as the THM management file 25.

The thumbnail group management information (THMGI) 34 comprises number-of-thumbnails information 35 and a THM map 36. The number-of-thumbnails information 35 indicates the above-mentioned integer L. When L is equal to N as described above, the number-of-VOBs information 5 in the still picture group management information (VOBGI) 3 may be used for L and therefore L may be omitted. The THM map 36 contains the address 37, attribute 38, and recording time (RECTM) 39 of each thumbnail picture 28. Note that, if the data size of a thumbnail picture (THM) is stored instead of the address (37), adding up the data sizes beginning at the start gives us the address of a desired entry. The attribute 38 includes such information as the number of vertical and horizontal pixels and coding method; if they are fixed, the attribute may be omitted.

The method described above, when used for making a search based on times, first finds the desired still picture group (VOBG) with the use of the first recording time (F_RECTM) 7 and the last recording time (L_RECTM) 8 of each group recorded in the still picture group management information (VOBGI) 3. Then, the method reads into memory only the thumbnail group management information (THMGI) 34 corresponding to the still picture group (VOBG). This prevents the memory size of the system controller from increasing. For example, if the pointer information (THMGI_P) 33 is 4 bytes and the maximum number of still picture groups (VOBG) is 1,000 (=64,000/64), then the VOB management file becomes 4,000 bytes larger than that used in the method shown in FIG. 1. If the maximum number of thumbnail pictures 28 of a thumbnail group (THMG) 40 is 64, the number-of-thumbnails information 35 is omitted by setting L equal to N, the address 37 is 4 bytes, the attribute 38 is omitted, and if the recording time (RECTM) 39 is 7 bytes, then the size of the thumbnail group management information (THMGI) 34 is 704 bytes (=64×(4+7)) for each group. Thus, as compared to the method shown in FIG. 1, the addition of only 4,704 bytes allows the recording time (RECTM) 39 of each still picture (VOB) 1 to be searched for. The total of this increase and the increase required for F_RECTM 7 and L_RECTM 8 (about 14 K bytes) described above is about 4.3% of the increase (about 438 K bytes) according to the method in which the recording time is recorded for each still picture.

The thumbnail group management information (THMGI) 34 shown in FIG. 7 is thought of as information managing the recording time (RECTM) 39 of each still picture (VOB) 1, meaning that it includes the functions of the still picture recording time management information (RECTMI) 22 shown in FIG. 4. Therefore, the pointer information (THMGI_P) 33 shown in FIG. 7 also includes the function of pointer information (RECTMI_P) 21 shown in FIG. 4.

Figure 8:
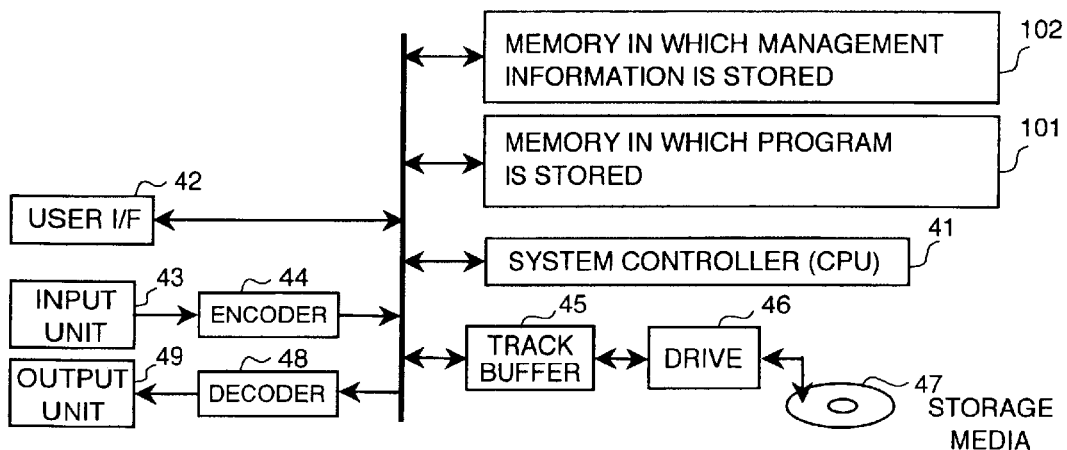
FIG. 8 is a diagram showing the configuration of a recording/playback apparatus of the present invention.

FIG. 8 is a diagram showing the configuration of an embodiment of the recording/playback apparatus according to the present invention.

Figure 11:
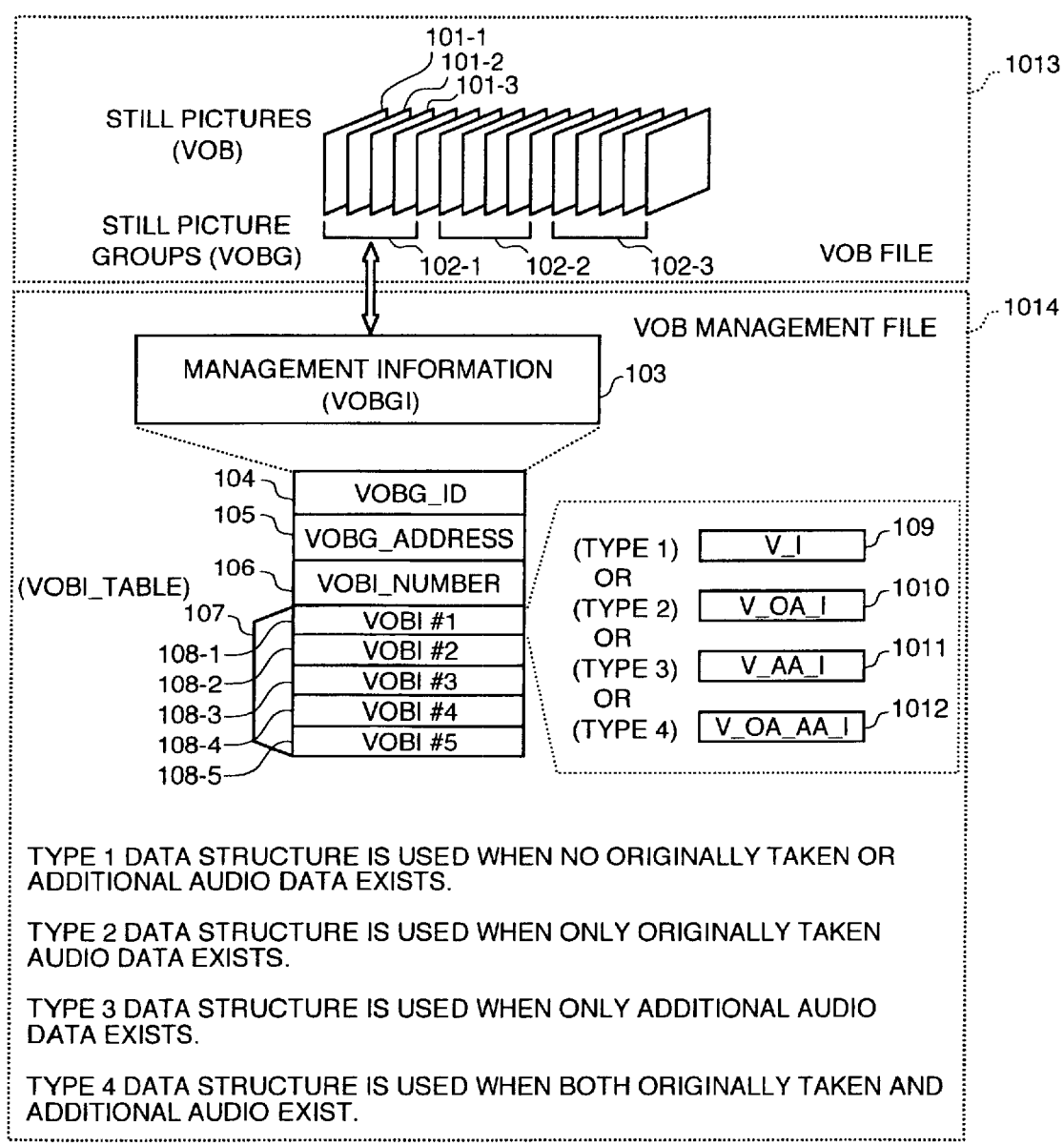
FIG. 11 is a diagram showing the configuration of an embodiment of the present invention.

The recording/playback apparatus may be a special hardware unit or a general-purpose hardware unit such as a personal computer controlled by a control procedure (hereinafter called a program) which will be described later. In either case, a system controller 41 performs operation according to the program stored in memory 101. The memory 101 where the program is stored may be the same storage medium as is used as memory 102 where the management information is recorded. Or, they may be separately configured. For example, a storage medium for rarely-rewritten data, such as a read-only memory (ROM) or flash memory, is used for the memory 101, while a storage medium for frequently-rewritten data, such as a Dynamic Random Access Memory (DRAM) or a Static Random Access Memory (SRAM), is used for the memory 102. The contents of the memory 101 where the program is stored may be preset by the manufacturer before shipping or, as shown in FIG. 11, the program may be read from another storage medium (computer-readable storage medium) before the apparatus starts operation.

Figure 20:
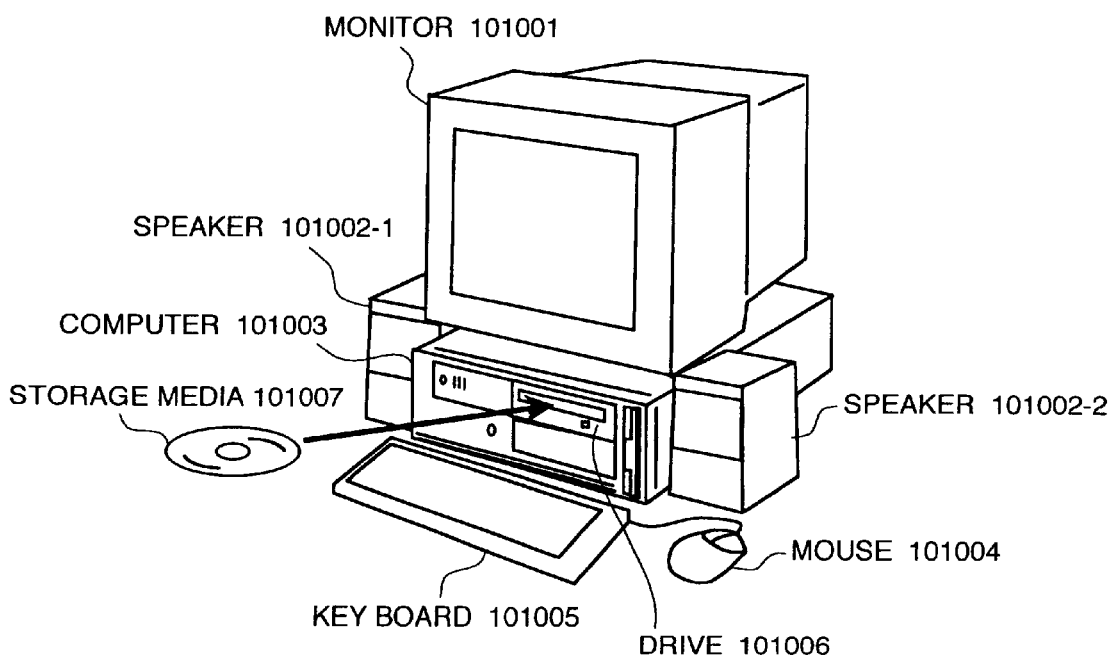
FIG. 20 is a diagram showing the configuration of the embodiment of the recording/playback apparatus used in the present invention.

FIG. 20 shows an example of the recording/playback apparatus configured according to the present invention. Referring to the figure, the recording/playback apparatus comprises a computer system unit 101003, a monitor 101001 on which pictures are displayed, speakers 101002 from which sounds are output, a mouse 101004 and a keyboard 101005 which receive user's instructions, and a disk drive 101006 which records data to, or plays back data from, a storage medium 101007. The storage medium 101007 stores thereon the program controlling the computer system unit 101003, and the program is read (installed) into memory 10101 of the computer via the drive 101006 before the computer is used as a recording/playback apparatus. The storage medium 101007 is a read-only disc, such as a CD-ROM or DVD-ROM, or a floppy disk. In addition, a rewritable medium such as a DVD-RAM may be used as the storage medium 101007 to allow the program and the picture/audio data to be mixed on the same medium.

First, the recording/playback apparatus shown in FIG. 8 receives an operation instruction from the user through the user interface 42. The system controller 41 starts operation control of the parts which will be described later. At recording time, an input unit 43 receives the picture signals and audio signals, and an encoder 44 codes the signals using the MPEG system. Coded data such as video, still picture, and audio data is entered into a drive 46 via a track buffer 45 for recording onto a storage medium 47. At this time, the management information generated by the system controller according to the method shown in FIGS. 1, 4, 6, and 7 is also recorded.

While coded data is recorded in real time, it is difficult to record management information at the same time. Therefore, recording of the management information is controlled so that it is once recorded in the memory 102 and then written onto the storage medium 47 after the coded data is recorded. Reducing the size of the memory 102 is one of the objects of the present invention.

On the other hand, at playback time, the drive reads the management information from the storage medium 47 into memory 102. Based on the management information that was read, the drive reads coded data into the track buffer 45. A decoder 48 decodes the coded data sent from the track buffer 45, and an output unit 49 outputs the decoded data.

The following describes a computer-readable storage medium for executing the still picture recording method and the still picture playback method according to the present invention, with emphasis on the operation of the system controller 41.

Figure 9:
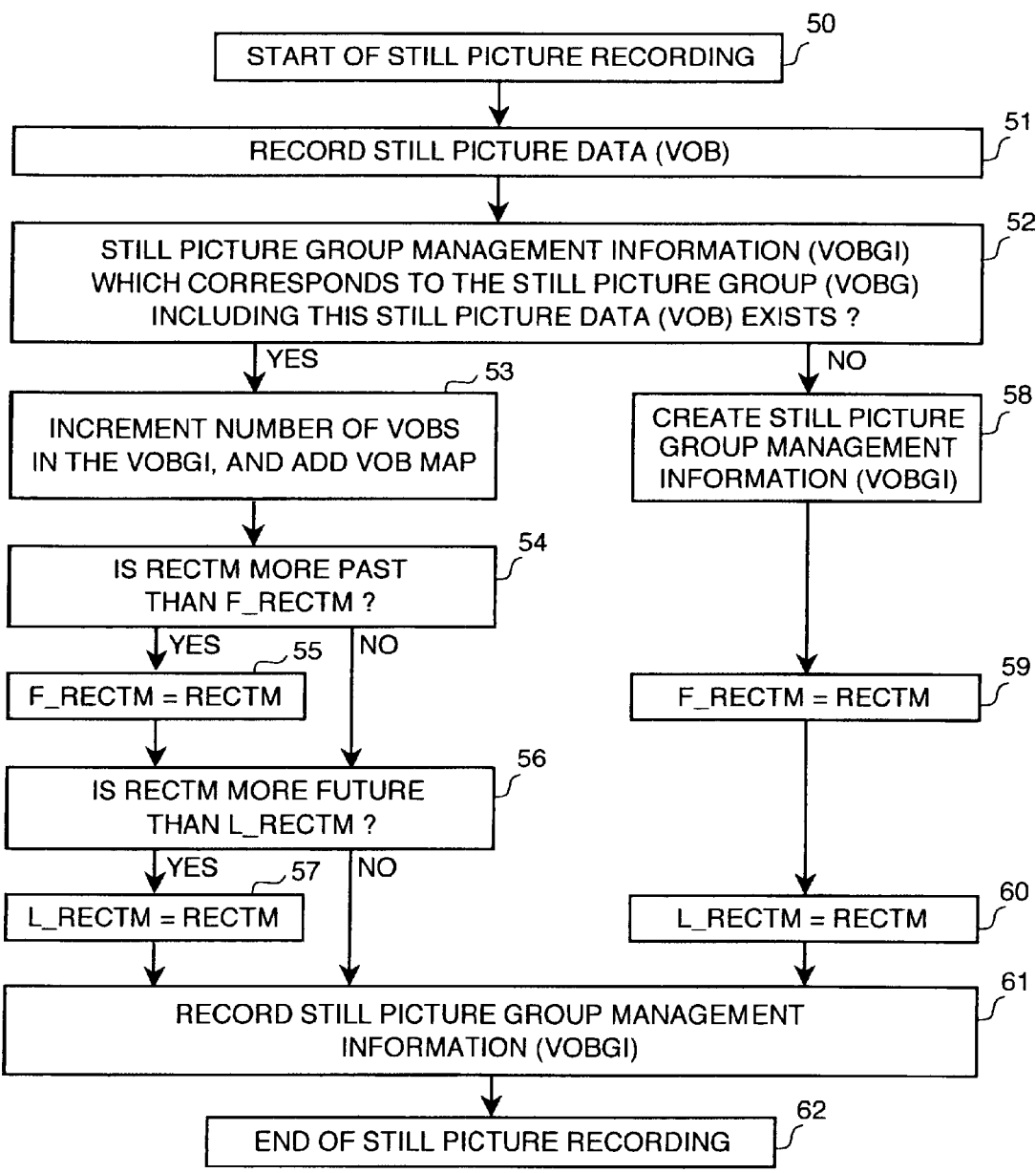
FIG. 9 is a diagram showing an example of the still picture recording method according to the present invention.

FIG. 9 shows an example of the still picture recording method according to the present invention. Recording starts in step 50. First, in step 51, coded stream data of the still picture (VOB) 1 shown in FIG. 1 is recorded on the storage medium as the VOB file 11. Control goes to step 52.

In step 52, a check is made to see if the still picture group management information (VOBGI) 3 corresponding to the still picture group (VOBG) 2 including the still picture (VOB) 1 already exists. If it exists, control goes to step 53; if not, control goes to step 58.

In step 53, the number-of-still-pictures information in the still picture group management information (VOBGI) 3 is increased by 1 and the address 9 and attribute 10 of the still picture (VOB) 1 recorded in step 51 is added to the VOB map 6. Control goes to step 54.

In step 54, the recording time (RECTM) of the still picture recorded in step 51 is compared with the first recording time (F_RECTM) 7 of the still picture group. If RECTM is earlier than F_RECTM (RECTM<F_RECTM), control goes to step 55; if not, control goes to step 56. In normal operation, although RECTM is never earlier than F_RECTM, this comparison is required because the condition (RECTM<F_RECTM) may occur, for example, when two or more recording apparatuses share the same storage medium and there is a difference among the clocks built in the apparatuses.

In step 55, the value of F_RECTM is replaced with the value of RECTM. That is, the value of F_RECTM is set to the earliest time in the still picture group. Then, control goes to step 56.

In step 56, the recording time (RECTM) of the still picture recorded in step 51 is compared with the last recording time (L_RECTM) 8 of the still picture group. If RECTM is later than L_RECTM (RECTM>L_RECTM), control goes to step 57; if not, control goes to step 61. In normal operation, although RECTM should be later than L_RECTM, this comparison is required because the condition (RECTM<L_RECTM) may occur, for example, when two or more recording apparatuses share the same storage medium and there is a difference among the clocks built in the apparatuses.

In step 57, the value of L_RECTM is replaced with the value of RECTM. That is, the value of L_RECTM is set to the latest time of the still picture group. Then, control goes to step 61.

In step 58, new still picture group management information (VOBGI) 3 is generated. The number-of-VOBs information 5 is set to 1, and the address 9 and the attribute 10 are set in the VOB map 6. Then, control goes to step 59.

In step 59, the recording time (RECTM) of the still picture recorded in step 51 is set in the first recording time (F_RECTM) 7 of the still picture group. Control goes to step 60.

In step 60, the recording time (RECTM) of the still picture recorded in step 51 is set in the last recording time (L_RECTM) 8 of the still picture group. Control goes to step 61.

In step 61, the still picture group management information (VOBGI) 3 generated or updated described above is recorded on the storage medium as the VOB management file 12. The recording operation ends in step 62.

Figure 10:
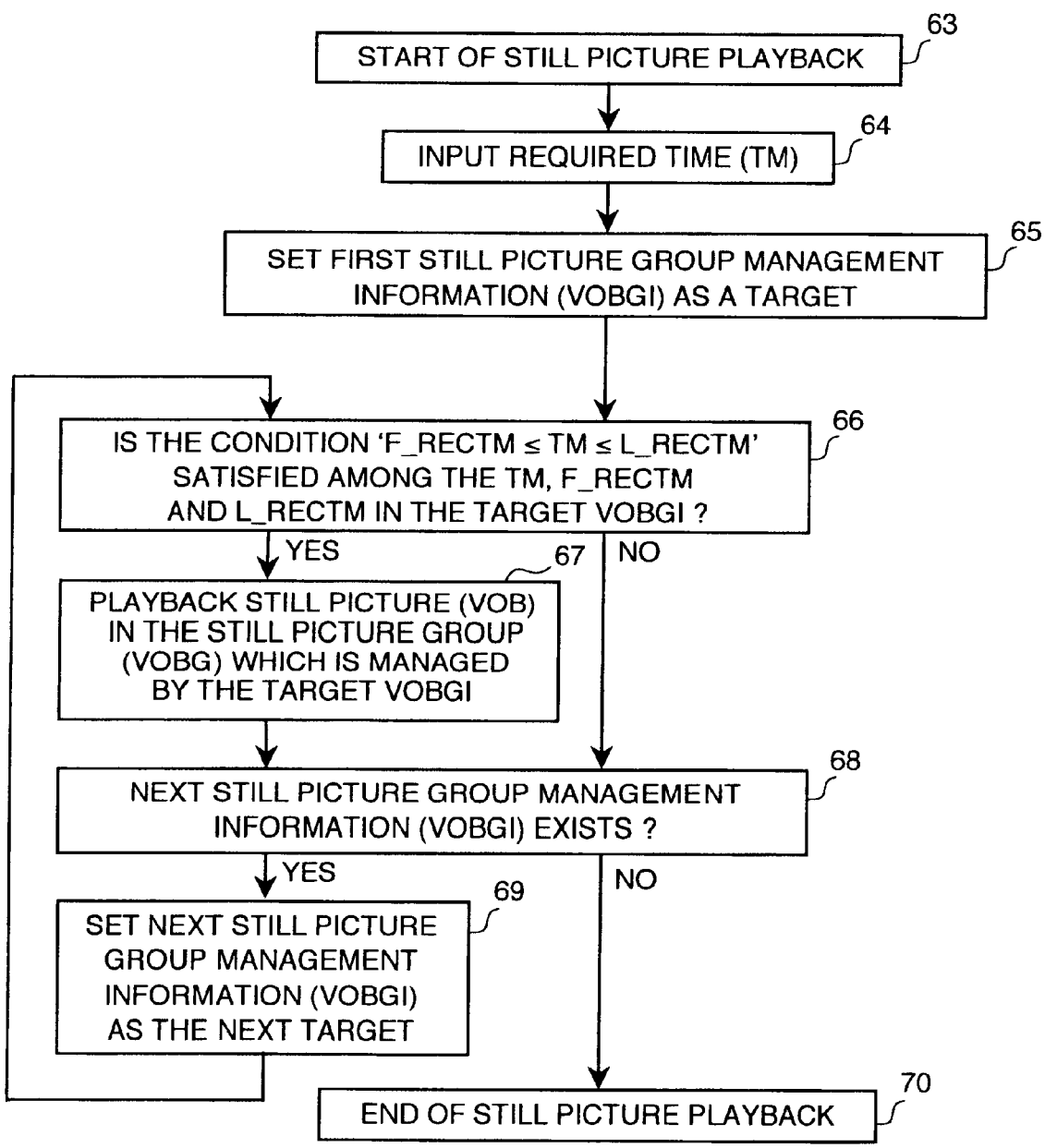
FIG. 10 is a diagram showing an example of the still picture playback method according to the present invention.

FIG. 10 shows an example of the still picture playback method according to the present invention. The figure shows how only the still picture (VOB) 1 whose recording time (RECTM) is near a desired time entered from a user interface 42 is selectively played back.

Playback starts in step 63. In step 64, a desired time (TM) is entered and control goes to step 65.

In step 65, the first still picture group management information (VOBGI) 3 is selected for processing. In this case, the first still picture group management information (VOBGI) is, for example, the still picture group management information (VOBGI) stored first in, and located at the beginning of, the VOB management file 12. Then, control goes to step 66.

In step 66, the time (TM) entered in step 64 is compared with the first recording time (F_RECTM) 7 and with the last recording time (L_RECTM) 8 in the still picture group management information (VOBGI) 3 selected for processing. If TM is equal to or later than F_RECTM and equal to or earlier than L_RECTM, that is, (F_RECTM≦TM≦L_RECTM) is satisfied, control goes to step 67; otherwise, control goes to step 68.

In step 67, the still picture (VOB) 1 belonging to the still picture group (VOBG) 2 managed by the still picture group management information (VOBGI) 3 selected for processing is played back. Control goes to step 68.

In step 68, a check is made to see if the next still picture group management information (VOBGI) exists. If it exists, control goes to step 69; if not, control goes to step 70. In this case, the next still picture group management information (VOBGI) is, for example, the still picture group management information (VOBGI) stored following the still picture group management information (VOBGI) currently selected for processing.

In step 69, the next still picture group management information (VOBGI) is set to the still picture group management information to be processed next. Control goes to step 66.

In step 70, the playback operation ends.

Through the above operation, only the still pictures (VOB) 1 belonging to the still picture groups (VOBG) satisfying the relation (F_RECTM≦TM≦L_RECTM) may be selectively played back.

Although only DVD-RAM discs are used as examples in the above embodiments, it is apparent that the present invention is not limited thereto but may be used for other recording media.

The above method achieves the first object of the present invention. That is, without increasing the data size of management information, the user can search a huge number of still pictures recorded on a large-capacity optical disc medium for a desired still picture using its recording time (RECTM).

An embodiment of the present invention that achieves the second object will be described with reference to the attached drawings.

Referring to FIG. 11 which shows the configuration of the embodiment of the present invention, the following describes how the recording sequence and the attributes of still pictures are recorded in the management information. In the figure, N (an integer equal to or larger than 1) still pictures (VOB) 101 coded, for example, in the I picture compression method of MPEG are grouped into one still picture group (VOBG) 102. Group generation is controlled so that the next still picture group (VOBG) 102 is generated when the number of still pictures (VOB) 101 of the still picture group (VOBG) 102 reaches a predetermined value (for example, 64) during still picture recording or when the operation mode is switched from video recording mode to still picture recording mode. Data (coded stream data) of the still pictures (VOB) 101 is recorded on a storage medium as a VOB file 1013 which will be described later, while information used to define the still picture groups (VOBG) 102 is recorded on the storage medium as a VOB management file 1014.

The VOB management file 1014 comprises management information (VOBGI) 103 corresponding to each still picture group (VOBG) 102. That is, each still picture group (VOBG) 102 has its own management information (VOBGI) 103 in this file. Note that information used to manage M (an integer equal to or larger than 1) pieces of management information (VOBGI) 103 may be provided separately in the VOB management file 1014. This information is not shown in the figure because it is not related directly to the present invention. The management information (VOBGI) 103 comprises still picture group identification information (VOBG_ID) 104, still picture group address information (VOBG_Address) 105, number-of-still-pictures information (VOBI_Number) 106, and a still picture management information table (VOBI_Table) 107. Each entry will be described below.

The still picture group identification information (VOBG_ID) 104, a unique value in the VOB management file 1014, identifies each piece of management information (VOBGI) 103 and the corresponding still picture group (VOBG) 102. Serial numbers beginning with the start of the VOB management file 1014 may be used for this information, in which case the still picture group identification information (VOBG_ID) 104 may be omitted.

The still picture group address information (VOBG_Address) 105 indicates the start address of coded stream data of the still picture group (VOBG) 102 within the VOB file. The information may also contain the end address.

The number-of-still-pictures information (VOBI_Number) 106 indicates the number of still pictures (VOB) 101 of the still picture group (VOBG) 102.

The still picture management information table (VOBI_Table) 107 is composed of still picture management information (VOBI) 108 entries of the still pictures (VOB) 101 of the still picture group (VOBG) 102. The still picture management information (VOBI) 108 entries are stored in the still picture management information table (VOBI_Table) 107 in the sequence in which the still pictures (VOB) 101 are stored. For example, still picture management information (VOBI) 108-1 shown in FIG. 11 corresponds to the still picture (VOB) 101-1.

The still picture management information (VOBI) 108 is classified into one of the following according to the attribute of the corresponding still picture (VOB) 101: management information on a still picture with no audio (hereinafter called audio) to be played back in synchronization with the still picture (first still picture management information (V_I)) 109, management information on a still picture with only audio (hereinafter called original audio) recorded almost at the same time the still picture is recorded (second still picture management information (V_OA_I)) 1010, management information on a still picture with only added (post-recorded) audio (hereinafter post-recorded audio) (third still picture management information (V_AA_I)) 1011, and management information on a still picture with both original audio and post-recorded audio (fourth still picture management information (V_OA_AA_I)) 1012.

The still picture management information table (VOBI_Table) 107, with this configuration, may hold the recording sequence and the attributes of the still pictures (VOB) 101 in the still picture group management information (VOBGI) 103. When the still picture (VOB) 101 is deleted, the corresponding still picture management information (VOBI) 108 is also deleted at the same time.

Next, referring to FIG. 14, the detailed configuration of the still picture management information (VOBI) 108 will be described. How to reduce the data size of management information will also be described.

FIG. 14, (a) shows the configuration of management information on a still picture with no audio (first still picture management information (V_I)) 109. V_I 109 is composed of identification information (V_I_ID) 1033, which is still picture identification information (VOBI_ID) identifying the first still picture management information, and an picture data size (V_Size) 1034. This data configuration, necessary and sufficient for playing back a still picture with no audio, eliminates redundant parts to minimize the management information data size. How to get the address of the video part (V_Part) will be described later.

FIG. 14, (b) shows the configuration of management information on a still picture with only original audio (second still picture management information (V_OA_I)) 1010. V_OA_I 1010 is composed of identification information (V_OA_I_ID) 1035, which is still picture identification information (VOBI_ID) identifying the second still picture management information, an picture data size (V_Size) 1036, an original audio data size (OA_Size) 1037, and an original audio playback time (OA_PTM) 1038. This data configuration, necessary and sufficient for playing back a still picture with only original audio, eliminates redundant parts to minimize the management information data size. How to get the addresses of the video part (V_Part) and the original audio part (OA_Part) will be described later.

FIG. 14, (c) shows the configuration of management information on a still picture with only post-recorded audio (third still picture management information (V_AA_I)) 1011. V_AA_I 1011 is composed of identification information (V_AA_I_ID) 1039, which is still picture identification information (VOBI_ID) identifying the third still picture management information, an picture data size (V_Size) 1040, and a post-recorded audio pointer information (AA_I_PTR) 1041 which will be described later. This data configuration, necessary and sufficient for playing back a still picture with only post-recorded audio, eliminates redundant parts to minimize the management information data size. How to get the addresses of the video part (V_Part) and the post-recorded audio part (AA_Part) will be described later.

FIG. 14, (d) shows the configuration of management information on a still picture with both original audio and post-recorded audio (fourth still picture management information (V_OA_AA_I)) 1012. V_OA_AA_I 1012 is composed of identification information (V_OA_AA_I_ID) 1042, which is still picture identification information (VOBI_ID) identifying the fourth still picture management information, an picture data size (V_Size) 1043, an original audio data size (OA_Size) 1044, an original audio playback time (OA_PTM) 1045, and post-recorded audio pointer information (AA_I_PTR) 1046 which will be described later. This data configuration, necessary and sufficient for playing back a still picture with both original audio and post-recorded audio, eliminates redundant parts to minimize the management information data size. How to get the addresses of the video part (V_Part), the original audio part (OA_Part), and the post-recorded audio part (AA_Part) will be described later.

FIG. 14, (e) shows the detailed configuration of the still picture identification information (VOBI_ID) 1047 described above. The still picture identification information (VOBI_ID) 1047 is composed of TY (Type) identifying one of V_I_ID 1033, V_OA_I_ID 1035, V_AA_I_ID 1039, and V_OA_AA_I_ID 1042 and PP (Playback Permission) indicating whether or not the still picture (VOB) 101 corresponding to the still picture identification information (VOBI_ID) 1047 is to be played back. The PP is a flag wherein "0" indicates that the still picture will be played back normally and "1" indicates that the still picture cannot be played back. The function of this flag is the same as that described in European Patent Application No. 99304691.1 or the corresponding U.S. patent application Ser. No. 09/332,882 described above.

Classifying the still picture attributes into four types as shown in (a) to (d) of FIG. 14 and then, for each of them, providing still picture management information (VOBI) 108 of the necessary and sufficient data size minimize the data size of the VOB management file 1014. For example, when four types of still pictures, that is, (a) still picture with no audio, (b) still picture with only original audio, (c) still picture with only post-recorded audio, and (d) still picture with both original audio and post-recorded audio, are recorded, the total data size of the picture management information (V_I) 1017 and the audio management information (A_I) 1020 is 2 bytes for (a), 11 bytes for (b), 11 bytes for (c), and 20 bytes for (d), respectively. In contrast, when the method shown in FIG. 14 is used, the data size of the still picture management information (VOBI) 108 is 2 bytes for (a), 6 bytes for (b), 4 bytes for (c), and 8 bytes for (d). For (c) and (d), the management information on the post-recorded audio part (AA_Part) is required separately. This will be described later.

In addition, the still picture identification information (VOBI_ID) 1047 placed at the start of each of still picture management information (VOBI) 108 entries gives us information on the data size of the still picture management information (VOBI) 108. For example, the TY value of "00", if stored in the still picture identification information (VOBI_ID) 1047, indicates that the VOBI_ID(1047) is V_I 109 and that the total data size is 2 bytes. Therefore, the recording position of VOBI #3(108-3) in the still picture management information table (VOBI_Table) 107 shown in FIG. 11 may be calculated by finding the recording position of VOBI #2(108-2) from the data size in VOBI #1(108-1) and then finding the recording position of VOBI #3(108-3) from the data size of VOBI #2(108-2).

FIG. 15, (a) shows an example of file structure used in the embodiment of the present invention. On recording media such as a DVD-RAM, coded stream data such as still pictures, management information, and so on are recorded as logical files. A storage medium, with a directory structure beginning at the root directory 1048, usually has the above-described VOB file 1013 and VOB management file 1014 generated and stored in a sub-directory 1049. Note that, instead of using the sub-directory 1049, the VOB file 1013 and the VOB management file 1014 may be recorded directly below the root directory 1048. The VOB file 1013 and the VOB management file 1014 may also be stored in another sub-directory which is below the sub-directory 1049.

Referring to FIG. 15, (b) in which an example of the VOB file 1013 is shown, how to get addresses from the data size information shown in FIG. 14 will be described. Within one still picture group (VOBG) 102, only the picture part (V_Part) and the original audio part (OA_Part) of the still picture (VOB) 101 are recorded continuously in the VOB file 1013 as shown in the figure. In other words, when other types of data such as video data must be recorded in the VOB file 1013, another still picture group (VOBG) 102 will be generated as described above. The figure shows an example of the contents of a VOB file. It contains the picture part (V_Part #1) 1050 of still picture #1(VOB #1), the picture part (V_Part #2) 1051 of still picture #2(VOB #2) and its original audio part (OA_Part #2) 1052 recorded almost at the same time, the picture part (V_Part #3) 1053 of still picture #3(VOB #3), the picture part (V_Part #4) 1054 of still picture #4(VOB #4) and its original audio part (OA_Part #4) 1055 recorded almost at the same time. In this case, for example, the start address of the picture part (V_Part #3) 1053 of still picture #3(VOB #3) is calculated by adding up the data size (V_Size #1) of V_Part #1(1050), the data size (V_Size #2) of V_Part #2(1051), and the data size (OA_Size #2) of OA_Part #2(1052) and then adding to the result the start address of V_Part #1(1050) recorded in the still picture group address information (VOBG_Address) 105. Adding up data sizes to get an address like this eliminates the need to update the contents of the management information of the following still picture #4(VOB #4) even when the still picture #3(VOB #3) is deleted. Therefore, this configuration significantly reduces the time needed to reconfigure the management information.

Figure 12:
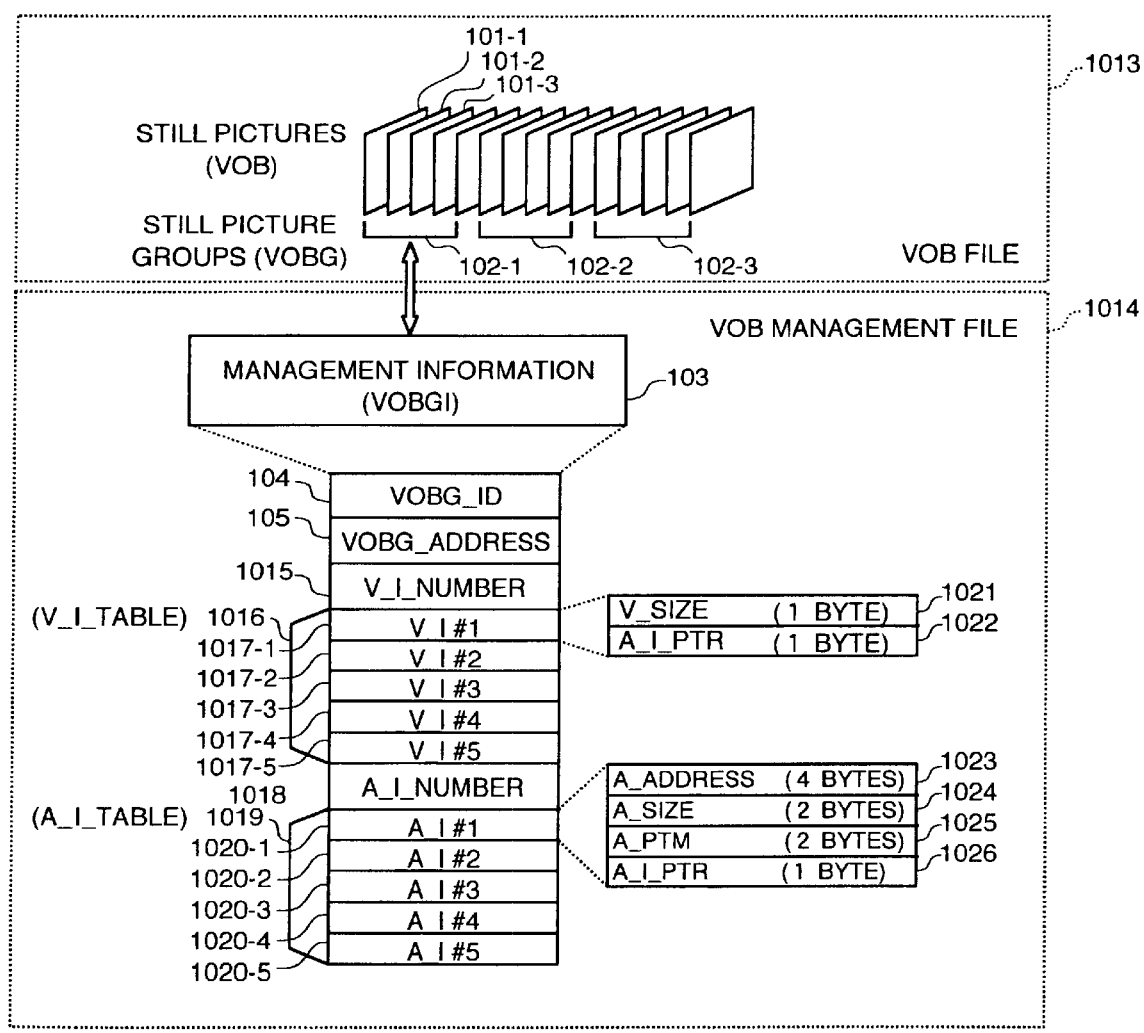
FIG. 12 is a diagram illustrating a technology proposed by the inventor and his group.

Since post-recorded audio parts (AA_Part) are added independently of the sequence in which the picture parts (V_Part) are recorded and because, in comparison with picture parts (V_Part) and original audio parts (OA_Part), there are far fewer post-recorded audio parts, the post-recorded audio parts (AA_Part) are configured separately from V_Part and OA_Part. For example, the audio management information (A_I) 1020 is provided in the audio management information table (A_I_Table) 1019 shown in FIG. 12 and, in that table, the address information (A_Address) 1023, audio data size (A_Size) 1024, and audio playback time (A_PTM) 1025 of the post-recorded audio part (AA_Part) are recorded. Storing a pointer to the number (such as #1) of the audio management information (A_I) 1020 in the post-recorded audio pointer information (AA_I_PTR) 1041, 1046 shown in FIG. 14 allows the address, data size, and playback time of the post-recorded audio part (AA_Part) corresponding to the still picture management information (VOBI) to be obtained. Also, because the number of post-recorded audio entries is limited to one, there is no need to provide the audio pointer information (A_I_PTR) 1026 to link to other audio data. This means that the audio pointer information (A_I_PTR) 1026 may be omitted.

In addition, the data configuration composed only of post-recorded audio parts (AA_Part) allows an address to be calculated by adding up the audio data sizes (A_Size) 1024 beginning at the start. This means that the audio data address information (A_Address)(1023) may be omitted.

FIG. 16 is a diagram showing the configuration of an embodiment of the recording/playback apparatus according to the present invention. The recording/playback apparatus may be a special hardware unit or a general-purpose hardware unit such as a personal computer controlled by a control procedure (hereinafter called a program) which will be described later. In either case, a system controller 1056 performs operation according to the program stored in memory 10101. The memory 10101 where the program is stored may be the same storage medium as is used as memory 10102 where the management information is recorded. Or, they may be separately configured. For example, a storage medium for rarely-rewritten data, such as a read-only memory (ROM) or flash memory, is used for the memory 10101, while a storage medium for frequently-rewritten data, such as a Dynamic Random Access Memory (DRAM) or a Static Random Access Memory (SRAM), is used for the memory 10102. The contents of the memory 10101 where the program is stored may be preset by the manufacturer before shipping or, as shown in FIG. 20, the program may be read from another storage medium (computer-readable storage medium) before the apparatus starts operation.

FIG. 20 shows an example of the recording/playback apparatus configured according to the present invention. Referring to the figure, the recording/playback apparatus comprises a computer system unit 101003, a monitor 101001 on which pictures are displayed, speakers 101002 from which sounds are output, a mouse 101004 and a keyboard 101005 which receive user's instructions, and a disk drive 101006 which records data to, or plays back data from, a storage medium 101007. The storage medium 101007 stores thereon the program controlling the computer system unit 101003, and the program is read (installed) into memory 10101 of the computer via the drive 101006 before the computer is used as a recording/playback apparatus. The storage medium 101007 is a read-only disc, such as a CD-ROM or DVD-ROM, or a floppy disk. In addition, a rewritable medium such as a DVD-RAM may be used as the storage medium 101007 to allow the program and the picture/audio data to be mixed on the same medium.

FIG. 16 is a diagram showing the configuration of an embodiment of the recording/playback apparatus according to the present invention. When a user interface 1057 of the recording/playback apparatus receives an operation instruction from the user, a system controller 1056 starts operation control of the parts which will be described later. At recording time, an input unit 1058 receives the picture signals and audio signals, and an encoder 1059 codes the signals using the MPEG system. Coded data such as video, still picture, and audio data is entered into a drive 1061 via a track buffer 1060 for recording onto a storage medium 1062. At this time, the management information generated by the system controller 1056 according to the method shown in FIGS. 11 and 14 is also recorded. While coded data is recorded in real time, it is difficult to record management information at the same time. Therefore, recording of the management information is controlled so that it is once recorded in the memory 10102 and then written onto the storage medium 1062 after the coded data is recorded. Reducing the size of the memory 10102 is one of the objects of the present invention.

On the other hand, at playback time, the drive 1061 reads the management information from the storage medium 1062 into memory 10102 and, then, based on the management information that was read, reads coded data into the track buffer 1060. A decoder 1063 decodes the coded data sent from the track buffer 1060, and an output unit 1064 outputs the decoded data. Because the detailed operation of the above units is disclosed, for example, in European Patent Application No. 99304691.1 or corresponding U.S. patent application Ser. No. 09/332,882 and its detailed configuration is known, they are not shown here. The following describes the recording method and the playback method according to the present invention, with emphasis on the operation of the system controller 1056 (that is, the contents of the program).

Figure 17:
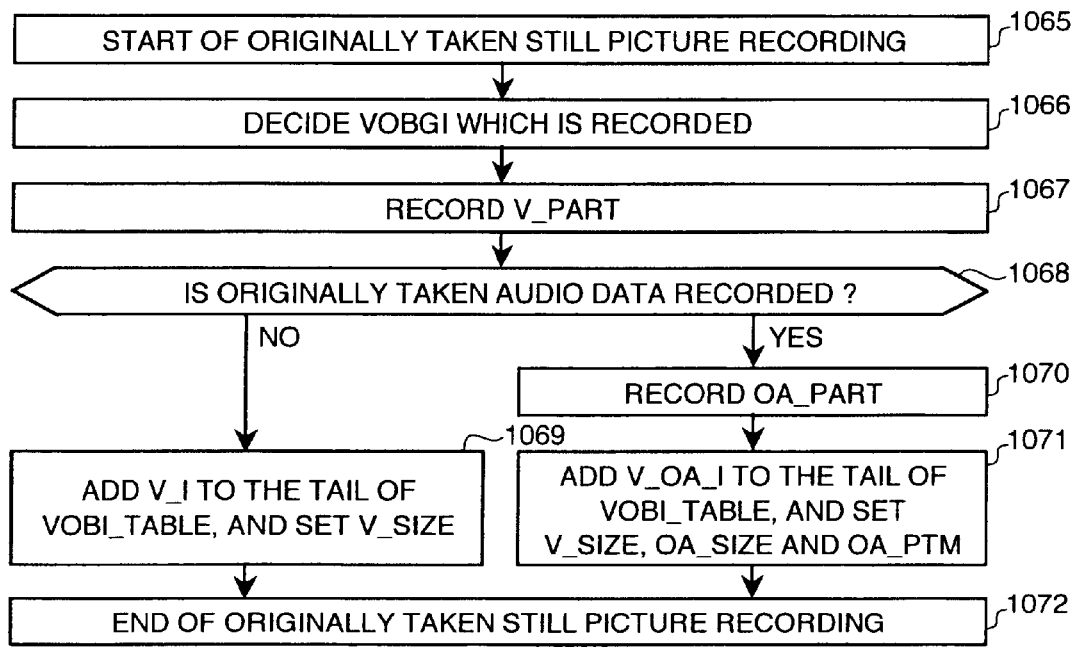
FIG. 17 is a diagram showing an example of recording method used in the present invention.

FIG. 17 shows an example of the original recording method according to the present invention. Recording starts in step 1065. In step 1066, the still picture group (VOBG) 102 to which a still picture (VOB) 101 is to belong and the corresponding still picture group management information (VOBGI) 103 are determined. Then, control goes to step 1067. At this time, if another still picture (VOB) 101 was recorded immediately before, the still picture group (VOBG) 102 and the still picture group management information (VOBGI) 103 used in recording immediately preceding still picture (VOB) 101 may be used. If the number of still pictures in the still picture group (VOBG) 102 has reached a predetermined number (for example, 64) or if other types of data such as video data was recorded immediately before, a new still picture group (VOBG) 102 and still picture group management information (VOBGI) 103 may be generated.

In step 1067, the coded stream data of the picture part (V_Part) of the still picture (VOB) 101 is recorded on the storage medium 1062 as the VOB file 1013. Control goes to step 1068.

In step 1068, a check is made to see if the original audio is to be recorded. If it is not to be recorded, control goes to step 1069; if it is to be recorded, control goes to step 1070. For this checking, the user may decide, before the still picture is recorded, the operation mode indicating whether the original audio is to be recorded. With this user-decided state stored in the mode switch or in the mode memory provided in the recording apparatus, whether or not the original audio is to be recorded may be determined according to the stored state.

In step 1069, the management information on a still picture with no audio (first still picture management information (V_I)) 109 is added to the end of the still picture management information table (VOBI_Table) 107 within the still picture group management information (VOBGI) 103 shown in FIG. 11. Then, the identification information (V_I_ID) identifying that the information is the first still picture information and picture data size (V_Size) 1034 are recorded in the (first still picture management information (V_I)) 109 as shown in FIG. 14. Control then goes to step 1072.

In step 1070, the coded stream data of the original audio part (OA_Part) to be played back in synchronization with the still picture (VOB) 101 is added to the VOB file 1013, and control is passed to step 1071.

In step 1071, the management information on a still picture with only original audio (second still picture management information (V_OA_I)) 1010 is added to the end of the still picture management information table (VOBI_Table) 107 within the still picture group management information (VOBGI) 103. Then, the identification information (V_OA_I_ID) identifying that the management information is the second still picture management information, the picture data size (V_Size) 1036, the original audio data size (OA_Size) 1037, and the original audio playback time (OA_PTM) 1038 are recorded in the (V_OA_I) 1010 as shown in FIG. 14. Control then goes to step 1072.

In step 1072, the original recording operation ends.

Figure 18:
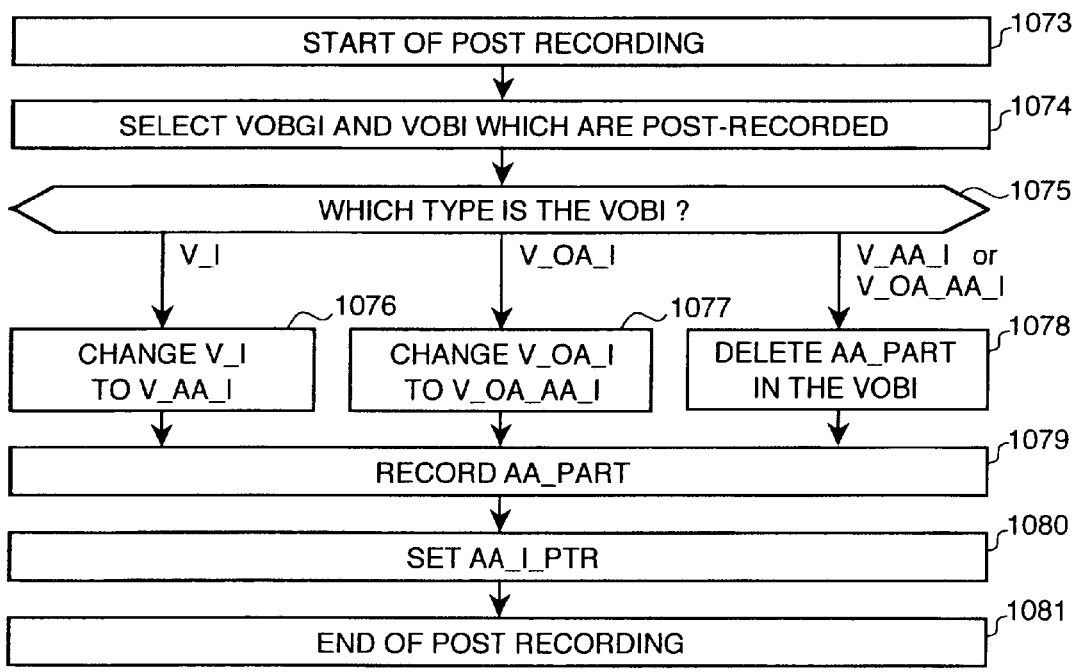
FIG. 18 is a diagram showing another example of recording method used in the present invention.

FIG. 18 shows an example of the post-recording method used in the present invention. Recording starts in step 1073. In step 1074, the user selects the still picture (VOB) 101 for which audio is to be post-recorded. At the same time, the system controller (1056) of the recording unit determines the still picture group (VOBG) 102 to which the still picture (VOB) 101 belongs as well as the corresponding still picture group management information (VOBGI) 103 and still picture management information (VOBI) 108. Then, control goes to step 1075.

In step 1075, a check is made for the still picture management information (VOBI) 108 selected in step 1074 to determine the type (V_I(109), V_OA_I(1010), V_AA_I(1011), or V_OA_AA_I(1012)) by referring to the VOBI_ID(1047) shown in FIG. 14. Then, control is passed to step 1076 if the type is V_I(109), to step 1077 if the type is V_OA_I(1010), or to step 1078 if the type is V_AA_I(1011) or V_OA_AA_I(1012).

In step 1076, V_I(109) is changed to V_AA I(1011) and control is passed to step 1079. That is, as shown in FIG. 14, the value of TY in (VOBI_ID) 1047 is changed from "00" to "10" and, at the same time, the management information following the VOBI_ID(1047) is shifted two bytes in memory to vacate a two-byte area for storing the post-recorded audio pointer information (AA_I_PTR) 1041.

In step 1077, V_OA_I(1010) is changed to V_OA_AA_I(1012) and control is passed to step 1079. That is, the value of TY in (VOBI_ID) 1047 is changed from "01" to "11" and, at the same time, the management information following the VOBI_ID(1047) is shifted two bytes in memory to vacate a two-byte area for storing the post-recorded audio pointer information (AA_I_PTR) 1046.

In step 1078, the post-recorded audio part (AA_Part) corresponding to this still picture is located using AA_I_PTR(1041) recorded in V_AA_I(1011) or using AA_I_PTR(1046) recorded in V_OA_AA_I(1012) and is deleted. Control goes to step 1079.

In step 1079, the coded stream data of the post-recorded audio part (AA_Part) is recorded on the storage medium 1062. Control goes to step 1080.

In step 1080, the post-recorded audio pointer information AA_I_PTR(1041 or 1046) providing a link to the post-recorded audio part (AA_Part) recorded in step 1079 is set in the VOBI_ID(1047). In step 1081, post-recording of audio data ends.

Figure 19:
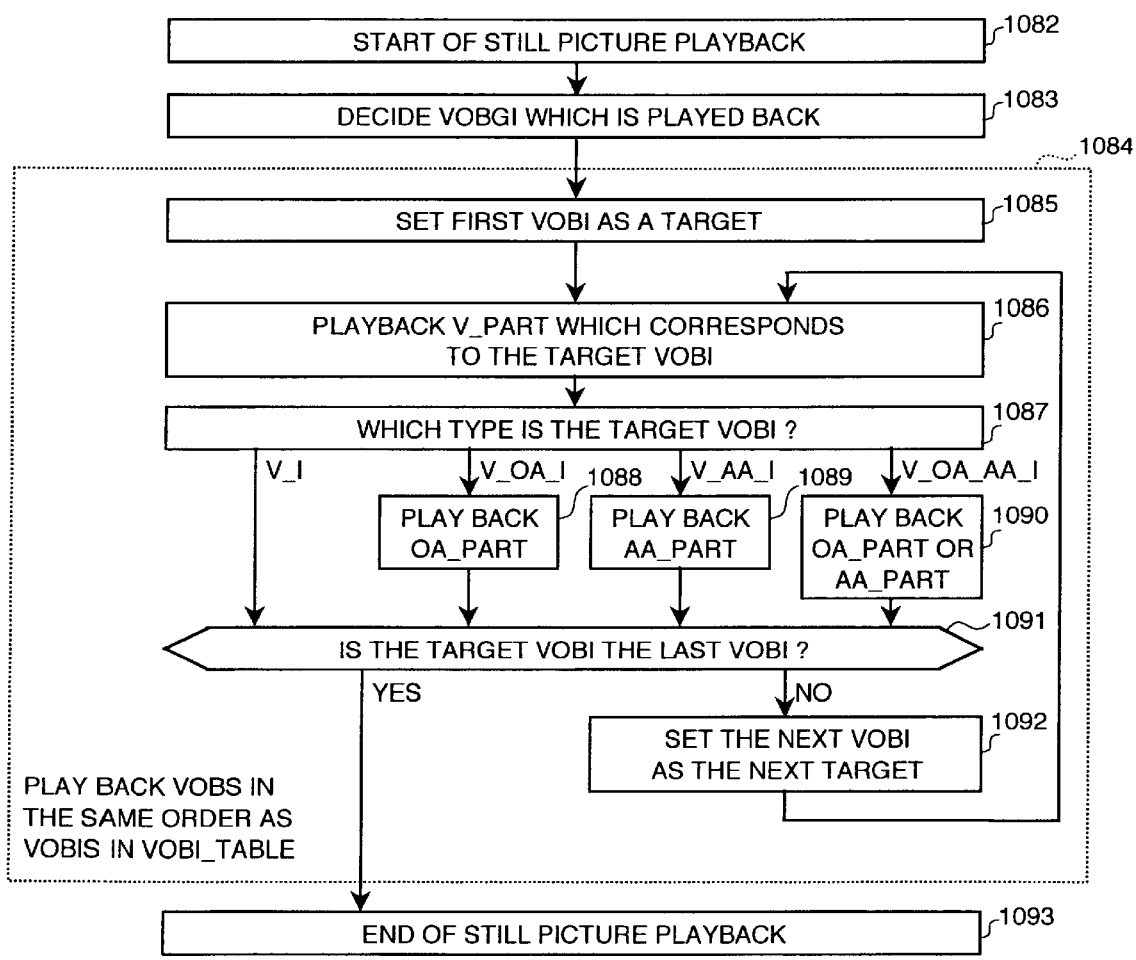
FIG. 19 is a diagram showing an example of playback method used in the present invention.

FIG. 19 shows an example of playing back still pictures according to the present invention. Playing back starts in step 1082. In step 1083, the still picture group (VOBG) 102 to be played back and the corresponding still picture group management information (VOBGI) 103 are determined. Then, control goes to step 1084. At this time, the user may directly select the still picture group (VOBG) 102 to be played back. Or, the still picture group management information (VOBGI) 103 may be selected sequentially according to the sequence in which still picture groups (VOBG) 102 were actually recorded, according to the sequence in which the still picture group management information (VOBGI) 103 is recorded in the VOB management file 1014, or according to a user-specified predetermined playback sequence. Note that the user-specified playback sequence is recorded in CellI in PGCI in the PGCI table described in European Patent Application No. 99304691.1 or corresponding U.S. patent application Ser. No. 09/332,882.

In step 1084, the still picture (VOB) 101 is played back according to the sequence in which the still picture management information (VOBI) 108 entries are recorded in the still picture management information table (VOBI_Table) 107 in the still picture group management information (VOBGI) 103. The procedure is shown in steps 1085 to 1092.

In step 1085, the still picture management information (VOBI) 108 corresponding to the still picture (VOB) 101 to be displayed first is selected for processing, and control is passed to step 1086. At this time, the first VOBI 108 in VOBI_Table 107 (VOBI #1(108-1) in FIG. 11) or a user specified VOBI_108 may be processed. Note that the user-specified VOBI 108 may be recorded in Cell_Start_Video in CellI described in European Patent Application No. 99304691.1 or corresponding U.S. patent application Ser. No. 09/332,882.

In step 1086, the V-Sizes 1034, 1036, 1040, or 1043 and OA_Sizes 1037 or 1044 recorded in the VOBI 108 entries from the first (VOBI) 108 in the VOBI_Table 107 to the VOBI 108 immediately preceding the VOBI 108 to be processed are added up. The resulting value is added to the start address stored in the still picture group address information (VOBG_Address) 105 to find the address of the desired picture part (V_Part). Next, the data size of the V_Part is obtained from the V_Size 1034, 1036, 1040, or 1043 recorded in the VOBI 108 determined in step 1085, and the V_Part is read from the storage medium 1062. The decoder 1063 decodes the picture data, and the output unit 1064 plays back the picture. Control goes to step 1087.

In step 1087, a check is made for the VOBI 108 to be processed to determine the type (V_I(109), V_OA_I(1010), V_AA_I(1011), or V_OA_AA_I(1012)) by referring to the (VOBI_ID) 1047. Then, control is passed to step 1091 if the type is V_I 109, to step 1088 if the type is V_OA_I(1010), to step 1089 if the type is V_AA_I(1011), or to step 1090 if the type is V_OA_AA_I(1012).

In step 1088, the data size of the original audio part (OA_Part) is obtained from the OA_Size 1037 recorded in the V_OA_I(1010) and, at the same time, the data size of the V_Part is added to the address of the V_Part obtained in step 1086 to find the address of the OA_Part. The OA_Part is read from the storage medium 1062. The decoder 1063 decodes the audio data, and the output unit 1064 plays back the audio. Control goes to step 1091.

In step 1089, the post-recorded audio part (AA_Part) corresponding to the still picture is located using the AA_I_PTR 1041 recorded in the V_AA_I 1011. The post-recorded audio part (AA_Part) is read from the storage medium 1062. The decoder 1063 decodes the audio data, and the output unit 1064 plays back the audio. Control goes to step 1091.

In step 1090, which audio part, either original audio part (OA_Part) or post-recorded audio part (AA_Part), is to be played back is determined according to the user's selection. When the OA_Part is to be played back, the OA_Part is read for playback using the OA_Size 1044 recorded in the V_OA_AA_I 1012 according to the procedure used in step 1088. When the AA_Part is to be played back, the AA_Part is read for playback using the AA_I_PTR 1046 recorded in the V_OA_AA_I(1012) according to the procedure used in step 1089. Control goes to step 1091.

In step 1091, a check is made to see if the VOBI 108 being processed is the last VOBI. If so, control goes to step 1093; if not, control goes to step 1092. At this time, the last VOBI may be the last VOBI 108 (VOBI #5(108-5) in FIG. 11) recorded in the VOBI_Table 107 or a user-specified VOBI 108. Note that a user specified VOBI 108 may be recorded in Cell_End_Video in Cell described in European Patent Application No. 99304691.1 or corresponding U.S. patent application Ser. No. 09/332,882.

In step 1092, the next VOBI 108 in the VOBI_Table 107 is selected for processing and control goes back to step 1086.

In step 1093, the playback operation ends.

The above operation enables still pictures (VOB) 101 to be played back according to the sequence in which the still picture management information (VOBI) 108 entries are recorded in the still picture management information table (VOBI_Table) 107.

Although only DVD-RAM and DVD-R discs are used as examples in the above embodiment, it is apparent that the present invention is not limited thereto but may be used for other recording media. While the data sizes of the parts (101 byte and so on) are shown in FIG. 14, they are for illustrative purposes only and the present invention is not limited to these sizes.

The method described above achieves the second object of the present invention. That is, the method records a huge number of still picture data pieces and audio data to be played back in synchronization with the still picture data onto a large-capacity optical disc medium. Even when some still pictures are deleted, the method significantly reduces the time needed to reconfigure management information and the data size of the management information.

What is claimed is:

1. A method of playing back a storage medium storing one or more still pictures (VOB) and still picture group management information (VOBGI) for managing one or more still pictures (VOB) as a still picture group (VOBG), said method comprising the steps of:

reading out said still picture management information (VOBI) from said still picture group management information (VOBGI) in said storage medium, wherein said still picture group management information (VOBGI) is classified into types of still picture management information including:

a first type of still picture management information (V_I) on a still picture with no audio to be reproduced in synchronism with the reproduction of the still picture, a second type of still picture management information (V_OA_I) on a still picture with only an original audio recorded substantially at the same time the still picture was recorded, a third type of still picture management information (V_AA_I) on a still picture with only a post-recorded audio added to the still picture already recorded, and fourth still picture management information (V_OA_AA_I) on a still picture with both of the original audio and a post-recorded audio added to the still picture already recorded, and said still picture management information (VOBI) has a data size designated by said type;

specifying a recording position of the still picture (VOB) corresponding to said still picture management information (VOBI) based on storing order of the read out still picture management information (VOBI) in said still picture group management information (VOBGI); and playing back the still picture in the specified recording position.

2. A method of playing back a storage medium storing one or more still pictures (VOB) and still picture group management information (VOBGI) for managing one or more still pictures (VOB) as a still picture group (VOBG), said method comprising the steps of:

reading out said still picture management information (VOBI) from said still picture group management information (VOBGI) in said storage medium, wherein said still picture group management information (VOBGI) is classified into types of still picture management information including:

a first type of still picture management information (V_I) on a still picture with no audio to be reproduced in synchronism with the reproduction of the still picture, a second type of still picture management information (V_OA_I) on a still picture with only an original audio recorded substantially at the same time the still picture was recorded, a third type of still picture management information (V_AA_I) on a still picture with only a post-recorded audio added to the still picture already recorded, and a fourth type of still picture management information (V_OA_AA_I) on a still picture with both of the original audio and a post-recorded audio added to the still picture already recorded, and said still picture management information (VOBI) has an identifier which indicates said type; and playing back only the still picture if said identifier is a first identifier, playing back the still picture with the original audio if said identifier is a second identifier, playing back the still picture with the post-recorded audio if said identifier is a third identifier, or playing back the still picture with either of the original audio and the post-recorded audio if said identifier is a fourth identifier.

3. A storage medium wherein a still picture (VOB) is recorded, having still picture group management information (VOBGI) for managing one or more still pictures (VOB) as a still picture group (VOBG), wherein:

said still picture group management information (VOBGI) is classified into types of still picture management information including:

a first type of still picture management information (V_I) on a still picture with no audio to be reproduced in synchronism with the reproduction of the still picture, a second type of still picture management information (V_OA_I) on a still picture with only an original audio recorded substantially at the same time the still picture was recorded, a third type of still picture management information (V_AA_I) on a still picture with only a post-recorded audio added to the still picture already recorded, and a fourth type of still picture management information (V_OA_AA_I) on a still picture with both of the original audio and a post-recorded audio added to the still picture already recorded, and said still picture group management information (VOBGI) includes still picture management information (VOBI) having an identifier which indicates said type; and said storage medium causes a playback apparatus for playing back the still picture recorded in said storage medium to execute the following process according to said identifier in said still picture management information (VOBI) of the still picture to be played back, said process includes a step of playing back only the still picture if said identifier is a first identifier, playing back the still picture with the original audio if said identifier is a second identifier, playing back the still picture with the post-recorded audio if said identifier is a third identifier, or playing back the still picture with either of the original audio and the post-recorded audio if said identifier is a fourth identifier.

4. A storage medium according to claim 3, wherein said first type of still picture management information (V_I) includes size information (V_Size) of image data (V_Part) of the still pictures to be managed.

5. A storage medium according to claim 3, wherein said second type of still picture management information (V_OA_I) includes size information (V_size) of image data (V_Part) of the still pictures to be managed, size information (OA_size) of an original audio data (OA_Part) of the still picture (VOB) to be managed and a playback time (OA_PTM) of said original audio data (OA_Part).

6. A storage medium according to claim 3, wherein said third type of still picture management information (V_AA_I) includes size information (V_Size) of image data (V_Part) of the still pictures to be managed, and pointer information (AA_I_PTR) for providing a link to a post-recorded audio data (AA_Part) of the still pictures (VOB) to be managed.

7. A storage medium according to claim 3, wherein said fourth type of still picture management information (V_OA_AA_I) includes size information (V_Size) of image data (V_Part) of the still pictures to be managed, size information (OA_Size) of original audio data (OA_Part) of the still pictures to be managed, an original audio playback time (OA_PTM) and pointer information (AA_I_PTR) for providing a link to a post-recorded audio data (AA_Part) of the still pictures (VOB) to be managed.

8. A storage medium wherein a still picture (VOB) is recorded, having still picture group management information (VOBGI) for managing one or more still pictures (VOB) as a still picture group (VOBG), wherein:

said still picture group management information (VOBGI) has a start address of the still picture data belonging to said still picture group and is classified into types of still picture management information including:

a first type of still picture management information (V_I) on a still picture with no audio to be reproduced in synchronism with the reproduction of the still picture, a second type of still picture management information (V_OA_I) on a still picture with only an original audio recorded substantially at the same time the still picture was recorded, a third type of still picture management information (V_AA_I) on a still picture with only a post-recorded audio added to the still picture already recorded, and a fourth type of still picture management information (V_OA_AA_I) on a still picture with both of the original audio and a post-recorded audio added to the still picture already recorded, and said still picture group management information (VOBGI) includes still picture management information (VOBI) having an identifier which indicates said type;

said still picture management information (VOBI) has a data size of the still picture to be managed if the type of said still picture management information (VOBI) is the first and third types of still picture management information;

said still picture management information (VOBI) has a data size of the still picture to be managed and a data size of the original audio if the type of said still picture management information (VOBI) is the second and fourth types of still picture management information;

said still picture management information (VOBI) is recorded in a order as same as the recording order of the corresponding still picture (VOB);

said-storage medium causes a playback apparatus for playing back the still picture recorded in said storage medium to accumulate data size from an initial still picture management information to the still picture management information of the still picture prior by one picture to the still picture to be played back, such that data sizes of the still pictures are accumulated if said still picture management information is said first and third types of still picture management information, data sizes of the still pictures and the original audio are accumulated if said still picture management information is said second and fourth types of still picture management information, the recording position of the still picture to be played back is determined by adding the accumulated data size to said start address, and the data size of the still picture to be played back is read out so as to make the still picture to be played back possible to play back, and only the still picture is played back if said identifier is a first identifier, the still picture with the original audio is played back if said identifier is a second identifier, the still picture with the post-recorded audio is played back if said identifier is a third identifier, or the still picture with either of the original audio and the post-recorded audio is played back if said identifier is a fourth identifier.

* * * * *

UNITED STATES PATENT AND TRADEMARK OFFICE
CERTIFICATE OF CORRECTION

PATENT NO. : 6,493,504 B1  Page 1 of 1
DATED : December 10, 2002
INVENTOR(S) : Akira Date et al.

It is certified that error appears in the above-identified patent and that said Letters Patent is hereby corrected as shown below:

Column 22,
Lines 20 and 60, delete "and" and insert -- or --.

Column 24,
Line 41, delete "and" and insert -- or --.

Signed and Sealed this

Second Day of September, 2003

JAMES E. ROGAN
*Director of the United States Patent and Trademark Office*